US012803756B2

(12) United States Patent
Yi et al.

(10) Patent No.: US 12,803,756 B2
(45) Date of Patent: Nov. 17, 2026

(54) METHOD AND APPARATUS FOR TRANSMITTING/RECEIVING SYNCHRONIZATION SIGNAL BLOCK BY USING NON-SERVING CELL IN WIRELESS COMMUNICATION SYSTEM

(71) Applicant: Samsung Electronics Co., Ltd., Suwon-si (KR)

(72) Inventors: Junyung Yi, Suwon-si (KR); Youngrok Jang, Suwon-si (KR); Youngbum Kim, Suwon-si (KR); Kyungjun Choi, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 18/842,306

(22) PCT Filed: Feb. 9, 2023

(86) PCT No.: PCT/KR2023/001936
§ 371 (c)(1),
(2) Date: Aug. 28, 2024

(87) PCT Pub. No.: WO2023/191301
PCT Pub. Date: Oct. 5, 2023

(65) Prior Publication Data
US 2025/0184087 A1 Jun. 5, 2025

(30) Foreign Application Priority Data
Mar. 28, 2022 (KR) ........................ 10-2022-0038409

(51) Int. Cl.
*H04W 4/00* (2018.01)
*H04L 5/00* (2006.01)
(Continued)

(52) U.S. Cl.
CPC ......... *H04L 5/0053* (2013.01); *H04W 56/001* (2013.01); *H04W 72/0446* (2013.01); *H04W 72/21* (2023.01)

(58) Field of Classification Search
CPC ........... H04W 56/001; H04W 72/0446; H04W 72/21; H04W 48/12; H04W 56/00; H04W 72/231; H04W 72/53
See application file for complete search history.

(56) References Cited

U.S. PATENT DOCUMENTS

2022/0377778 A1 11/2022 Yi et al.
2023/0224880 A1* 7/2023 Xiong .................. H04L 5/0007 370/329
2024/0340860 A1* 10/2024 Wang .................. H04B 7/0408

FOREIGN PATENT DOCUMENTS

KR 10-2022-0152789 A 11/2022

OTHER PUBLICATIONS

Moderator (Sharp), FL Summary #4 on Enhancements on PUSCH repetition type A, R1-2200789 3GPP TSG-RAN WG1 #107bis-e, Jan. 26, 2022.

(Continued)

*Primary Examiner* — Omoniyi Obayanju
(74) *Attorney, Agent, or Firm* — Jefferson IP Law, LLP

(57) ABSTRACT

The present disclosure relates to a 5G or 6G communication system for supporting a higher data transmission rate. The method for a terminal may comprise the operations of: receiving SSB configurations related to first and second SSBs, which correspond to a serving cell and a non-serving cell, respectively, and have different PCIs; determining valid slots for repeated PUSCH transmissions by considering both the first SSB corresponding to the serving cell and the second SSB corresponding to the non-serving cell according
(Continued)

to the SSB configurations; identifying that the first SSB and/or the second SSB overlaps, in the first slot of the valid slots, with the resource to which PUSCH is mapped; dropping the transmission of the PUSCH in the first slot in response to the identification, and receiving the first SSB and/or the second SSB through the serving cell and/or the non-serving cell.

20 Claims, 16 Drawing Sheets

(51) Int. Cl.

| | |
|---|---|
| ***H04W 56/00*** | (2009.01) |
| ***H04W 72/0446*** | (2023.01) |
| ***H04W 72/21*** | (2023.01) |

(56) References Cited

OTHER PUBLICATIONS

Moderator (vivo), Feature lead summary#3 on Enhancements on Multi-TRP inter-cell operation R1-2202887, 3GPP TSG-RAN WG1 #108-e, Mar. 4, 2022.
Moderator (Samsung), Moderator summary for multi-beam enhancement, R1-2109466, 3GPP TSG-RAN WG1 #106bis-e, Oct. 13, 2021.
Futurewei, Inter-cell multi-TRP operation, R1-2102762, 3GPP TSG-RAN WG1 #104bis-e, Apr. 7, 2021.
Huawei, HiSilicon, Feature Summary of Enhancements on Multi-TRP/Panel Transmission, R1-1911425, 3GPP TSG-RAN WG1 #98bis, Oct. 22, 2019.
International Search Report and written opinion dated May 12, 2023, issued in International Application No. PCT/KR2023/001936.

* cited by examiner

METHOD AND APPARATUS FOR TRANSMITTING/RECEIVING SYNCHRONIZATION SIGNAL BLOCK BY USING NON-SERVING CELL IN WIRELESS COMMUNICATION SYSTEM

CROSS-REFERENCE TO RELATED APPLICATION(S)

This application is a U.S. National Stage application under 35 U.S.C. § 371 of an International application number PCT/KR2023/001936, filed on Feb. 9, 2023, which is based on and claims priority of a Korean application number 10-2022-0038409, filed on Mar. 28, 2022, in the Korean Patent Office, the disclosure of each of which is incorporated by reference herein in its entirety.

TECHNICAL FIELD

The disclosure relates to a method and device for transmitting and receiving a synchronization signal block of a non-serving cell in a wireless communication system.

BACKGROUND ART 5G mobile communication technology defines a wide frequency band to enable fast transmission speed and new services and may be implemented in frequencies below 6 GHz ('sub 6 GHz'), such as 3.5 GHz, as well as in ultra-high frequency bands ('above 6 GHz'), such as 28 GHz and 39 GHz called millimeter wave (mmWave). Further, 6G mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by 1/10.

In the early stage of 5G mobile communication technology, standardization was conducted on beamforming and massive MIMO for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

With the recent development of 5G/6G communication systems, the need for a procedure to repeatedly perform uplink transmission to expand cell coverage in the ultra-high frequency (mmWave) band is emerging.

DETAILED DESCRIPTION OF THE INVENTION

Technical Problem

Various embodiments of the disclosure may determine reception and/or transmission of a synchronization signal block transmitted in a non-serving cell in a wireless communication system.

Various embodiments of the disclosure may determine transmission or reception of other channels (e.g., physical uplink shared channel (PUSCH), physical uplink control channel (PUCCH), physical downlink control channel (PDCCH), or physical downlink shared channel (PDSCH)) that may overlap the SSB of the serving cell and/or non-serving cell.

Objects of the disclosure are not limited to the foregoing, and other unmentioned objects would be apparent to one of ordinary skill in the art from the following description.

Technical Solution

In various embodiments, a method for transmitting, by a user equipment (UE), a physical uplink shared channel (PUSCH) in a wireless communication system may comprise receiving synchronization signal block (SSB) configurations related to first and second SSBs respectively corresponding to a serving cell and a non-serving cell and having different physical cell identifiers (PCIs), determining available slots for PUSCH repeated transmission considering both the first SSB corresponding to the serving cell and the second SSB corresponding to the non-serving cell according to the SSB configurations, identifying that at least one of the first SSB and the second SSB overlaps a resource to which the PUSCH is mapped in a first slot among the available slots, and dropping transmission of the PUSCH during the first slot and receiving the first SSB and/or the second SSB through the serving cell and/or the non-serving cell in response to the identification.

A UE transmitting a physical uplink shared channel (PUSCH) in a wireless communication system, according to various embodiments, may comprise a transceiver and a processor coupled with the transceiver. The processor may be configured to receive synchronization signal block (SSB) configurations related to first and second SSBs respectively corresponding to a serving cell and a non-serving cell and having different physical cell identifiers (PCIs), determine available slots for physical uplink shared channel (PUSCH) repeated transmission considering both the first SSB corresponding to the serving cell and the second SSB corresponding to the non-serving cell according to the configuration information, identify that at least one of the first SSB and the second SSB overlaps a resource to which the PUSCH is mapped in a first slot among the available slots, and drop transmission of the PUSCH during the first slot and receive the first SSB and/or the second SSB through the serving cell and/or the non-serving cell in response to the identification.

A method for receiving, by a base station, a physical uplink shared channel (PUSCH) in a wireless communication system, according to various embodiments, may comprise transmitting, to a user equipment (UE), synchronization signal block (SSB) configurations related to first and second SSBs respectively corresponding to a serving cell and a non-serving cell and having different physical cell identifiers (PCIs), determining available slots for PUSCH repeated transmission considering both the first SSB corresponding to the serving cell and the second SSB corresponding to the non-serving cell according to the SSB configurations, identifying that at least one of the first SSB and the second SSB overlaps a resource to which the PUSCH is mapped in a first slot among the available slots, and determining that transmission of the PUSCH is dropped by the UE during the first slot in response to the identification.

A base station receiving a physical uplink shared channel (PUSCH) in a wireless communication system, according to various embodiments, may comprise a transceiver and a processor coupled with the transceiver. The processor may be configured to transmit, to a user equipment (UE), synchronization signal block (SSB) configurations related to first and second SSBs respectively corresponding to a serving cell and a non-serving cell and having different physical cell identifiers (PCIs), determine available slots for PUSCH repeated transmission considering both the first SSB corresponding to the serving cell and the second SSB corresponding to the non-serving cell according to the SSB configurations, identify that at least one of the first SSB and the second SSB overlaps a resource to which the PUSCH is mapped in a first slot among the available slots, and determine that transmission of the PUSCH is dropped by the UE during the first slot in response to the identification.

MODE FOR CARRYING OUT THE INVENTION

Figure 1:
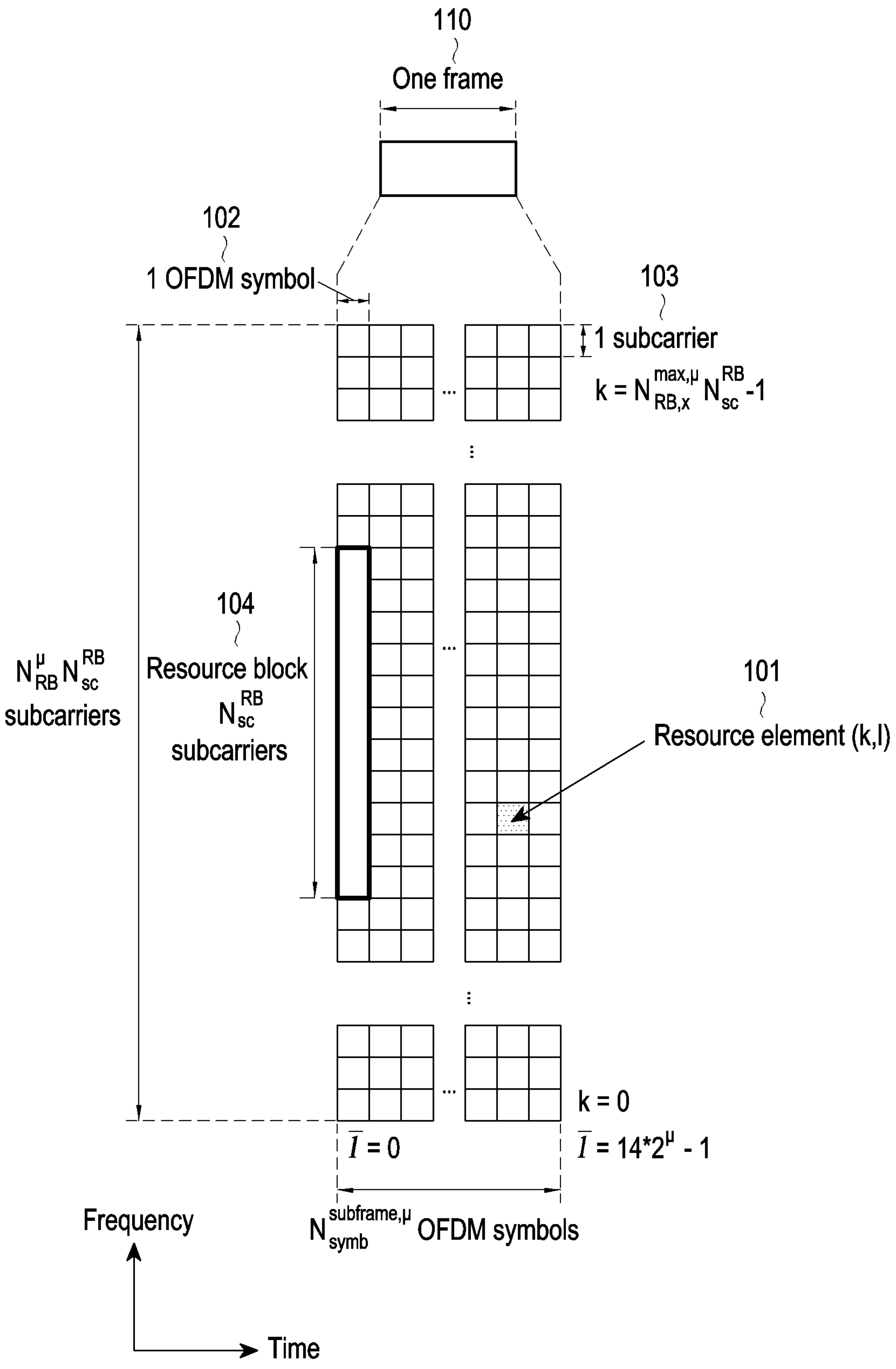
FIG. 1 is a view illustrating a basic structure of a time-frequency domain, which is a radio resource domain, in a wireless communication system according to an embodiment.

Hereinafter, embodiments of the disclosure are described in detail with reference to the accompanying drawings. In describing the embodiments of the disclosure, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Hereinafter, the base station may be an entity allocating resource to a user equipment (UE) and may be at least one of gNode B, eNode B, Node B, base station (BS), wireless access unit, base station controller, or node over network. The terminal may include a user equipment (UE), mobile station (MS), cellular phone, smartphone, computer, or multimedia system capable of performing communication functions. According to the present invention, downlink (DL) may refer to a wireless transmission path of signal transmitted from the base station to the terminal, and uplink (UL) refers to a wireless transmission path of signal transmitted from the terminal to the base station.

Although LTE or LTE-A systems may be described below as an example, the embodiments may be applied to other communication systems having a similar technical background or channel pattern. For example, 5G mobile communication technology (5G, new radio, NR) developed after LTE-A may be included therein, and 5G below may be a concept including legacy LTE, LTE-A and other similar services. Further, the embodiments may be modified in such a range as not to significantly depart from the scope of the present invention under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments, a " . . . unit" may include one or more processors.

Hereinafter, embodiments of the present invention are described in detail with reference to the accompanying drawings. Hereinafter, for methods and devices proposed in embodiments of the disclosure, embodiments of the disclosure are described as an example for enhancing uplink coverage when performing a random access procedure. However, without limitations to each embodiment, all or some of one or more embodiments proposed herein may be combined to be used for configuring frequency resources corresponding to other channels. Further, embodiments of the disclosure may be modified in such a range as not to significantly depart from the scope of the present invention under the determination by one of ordinary skill in the art and such modifications may be applicable.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra mobile broadband (UMB), and institute of electrical and electronics engineers (IEEE) 802.17e communication standards.

As a representative example of such broadband wireless communication system, the LTE system adopts orthogonal frequency division multiplexing (OFDM) for downlink and single carrier frequency division multiple access (SC-FDMA) for uplink. The uplink may refer to a radio link in which the terminal (hereinafter, referred to as user equipment (UE)) transmits data or control signals to the base station (evolved node B (eNode B) or base station (BS)), and the downlink refers to a radio link through which the base station transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to simultaneously support various requirements to freely reflect various requirements from users and service providers. Services considered for 5G communication systems include, e.g., enhanced mobile broadband (eMBB), massive machine type communication (MMTC), or ultra reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), may need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

Further, mMTC is also considered to support application services, such as internet of things (IoT) in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it requires much broader coverage as compared with other services that the 5G communication system provides. mMTC-supportive UEs, due to the need for being low cost and difficulty in frequently exchanging batteries, are required to have a very long battery life, e.g., 10 years to 16 years.

URLLC is a mission-critical, cellular-based wireless communication service. For example, there may be considered a service for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of 10-5 or less. Thus, for URLLC-supportive services, the 5G communication system is required to provide a shorter transmit time interval (TTI) than those for other services while securing reliable communication links by allocating a broad resource in the frequency band.

The three services of the 5G communication system (hereinafter interchangeable with the 5G system), i.e., eMBB, URLLC, and mMTC, may be multiplexed and transmitted in one system. The services may adopt different TX/RX schemes and TX/RX parameters to meet their different requirements.

The frame structure of the 5G system is described below in more detail with reference to the drawings. Hereinafter, as wireless communication systems to which the disclosure is applied, 5G systems are described as an example for convenience of description. However, embodiments of the disclosure may also be applied to post-5G systems or other communication systems in the same or similar manner.

FIG. 1 is a view illustrating a basic structure of a time-frequency domain, which is a radio resource domain, in a wireless communication system according to an embodiment.

In FIG. 1, the horizontal axis represents the time domain, and the vertical axis represents the frequency domain. A basic unit of a resource in the time and frequency domain is a resource element (RE) 101, which may be defined as one orthogonal frequency division multiplexing (OFDM) symbol (or discrete Fourier transform spread OFDM (DFT-s-OFDM) symbol) 102 on the time axis, and as one subcarrier 103 on the frequency axis.

$$N_{sc}^{RB}$$

(e.g., 12) consecutive REs, which represent the number of subcarriers per resource block (RB) in the frequency domain, may constitute resource block (RB) 104.

$$N_{symb}^{subframe}$$

consecutive OFDM symbols, which represent the number of symbols per subframe in the time domain, may constitute one subframe 110.

Figure 2:
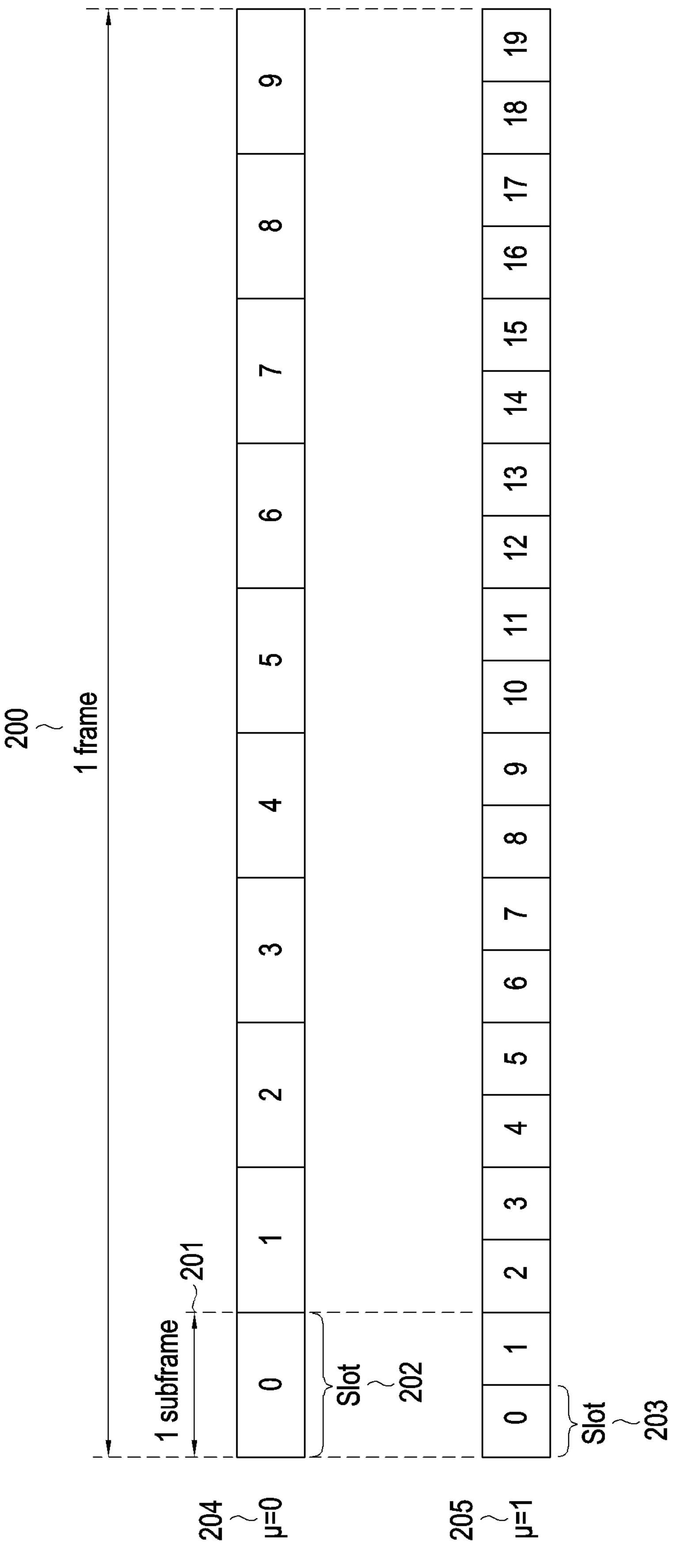
FIG. 2 is a view illustrating a slot structure considered in a wireless communication system according to an embodiment.

FIG. 2 is a view illustrating a slot structure considered in a wireless communication system according to an embodiment.

FIG. 2 illustrates an example structure including a frame 200, a subframe 201, and a slot 202 or 203. One frame 200 may be defined as 10 ms. One subframe 201 may be defined as 1 ms, and thus, one frame 200 may consist of a total of 10 subframes 201. One slot 202 or 203 may be defined as 14 OFDM symbols (that is, the number $$(N_{symb}^{slot})$$

of symbols per slot=14). One subframe 201 may be composed of one or more slots 202 or 203, and the number of slots 202 and 203 per subframe 201 may differ depending on u (204 or 205), which is a configured value for the subcarrier space (SCS).

A slot structure of μ=0 (204) and a slot structure of μ=1 (205) are shown as the configured subcarrier spacing values.

When μ=0 (204), one subframe 201 may be constituted of one slot 202. When μ=1 (205), one subframe 201 may consist of two slots (e.g., including the slot 203). In other words, according to the configured subcarrier spacing value μ, the number $$N_{slot}^{subframe,\mu}$$

of slots per subframe may vary, and accordingly, the number $$N_{slot}^{subframe,\mu}$$

of slots per frame may differ. For example, according to each subcarrier spacing μ, $$N_{slot}^{subframe,\mu} \text{ and } N_{slot}^{frame,\mu}$$

may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |
| 6 | 14 | 640 | 64 |

The 5G wireless communication system may transmit a synchronization signal block (SSB) (which may be interchangeably used with, e.g., SS block, or SS/PBCH block) for initial access of the UE. The synchronization signal block may include a primary synchronization signal (PSS), a secondary synchronization signal (SSS), and a physical broadcast channel (PBCH).

In the initial access phase in which the UE accesses the system, the UE may obtain downlink time and frequency domain synchronization from a synchronization signal (SS) through a cell search and performs the cell ID. The synchronization signal may include a PSS and an SSS. The UE may receive the PBCH, transmitting a master information block (MIB), from the base station, obtaining system information related to transmission and reception, such as system bandwidth or related control information, and basic parameter values. Based on the information, the UE may perform decoding on a physical downlink control channel (PDCCH) and a physical downlink shared channel (PDSCH), obtaining the system information block (SIB). Thereafter, the UE may exchange identification-related information for the base station and the UE through a random access step and undergoes registration and authentication to thus initially access the network.

A cell initial access procedure of a 5G wireless communication system is described below with reference to the drawings.

The synchronization signal is a signal serving as a reference for cell search and may be transmitted, with a subcarrier spacing appropriate for the channel environment (e.g., including phase noise) for each frequency band applied thereto. The 5G base station may transmit a plurality of synchronization signal blocks according to the number of analog beams to be operated. For example, a PSS and an SSS may be mapped over 12 RBs and transmitted, and a PBCH may be mapped over 24 RBs and transmitted. Described below is a structure in which a synchronization signal and a PBCH are transmitted in a 5G communication system.

Figure 3:
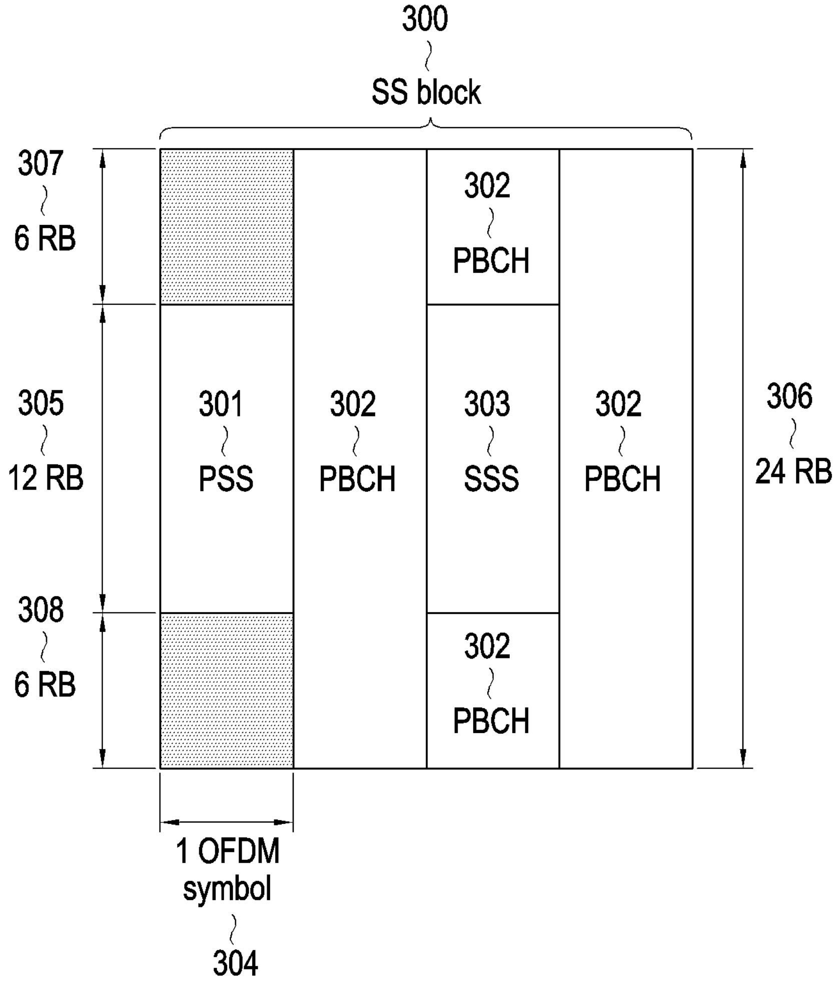
FIG. 3 is a view illustrating a synchronization signal block considered in a wireless communication system according to an embodiment.

FIG. 3 is a view illustrating a synchronization signal block considered in a wireless communication system according to an embodiment.

According to FIG. 3, a synchronization signal block (SS block) 300 may include a PSS 301, an SSS 303, and broadcast channels (PBCH) 302.

The synchronization signal block 300 may be mapped to four OFDM symbols 304 on the time axis. The PSS 301 and the SSS 303 may be transmitted in 12 RBs 305 on the frequency axis and in first and third OFDM symbols on the time axis, respectively. In the 5G system, e.g., a total of 1008 different cell IDs may be defined. The PSS 301 may have three different values according to the physical cell ID (PCI) of the cell, and the SSS 303 may have 336 different values. The UE may obtain one of 1,008 (=336×3) cell IDs, as a combination, by detection on the PSS 301 and the SSS 303. This may be represented as Equation 1.

$$N_{ID}^{cell} = 3N_{ID}^{(1)} + N_{ID}^{(2)} \quad \text{Equation 1}$$

where $$N_{ID}^{(1)}$$

may be estimated from the SSS 303 and have a value between 0 and 335.

$$N_{ID}^{(2)}$$

may be estimated from the PSS 301 and have a value between 0 and 2. The UE may estimate $$N_{ID}^{(cell)}$$

which is the cell ID, by a combination of $$N_{ID}^{(1)} \text{ and } N_{ID}^{(2)}.$$

The PBCH 302 may be transmitted in the resource including 24 RBs 306 on the frequency axis and 6 RBs 307 and 308 on both sides of each of the second and fourth OFDM symbols, except for the intermediate 12 RBs 305 where the SSS 303 is transmitted, on the time axis. The PBCH 302 may include a PBCH payload and a PBCH demodulation reference signal (DMRS). In the PBCH payload, various system information called MIB may be transmitted. For example, the MIB may include information as shown in Table 2 below.

TABLE 2

| | |
|---|---|
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

Synchronization signal block information: The offset in the frequency domain of the synchronization signal block may be indicated through the four-bit ssb-SubcarrierOffset in the MIB. The index of the synchronization signal block including the PBCH may be indirectly obtained through decoding of the PBCH DMRS and PBCH. In an embodiment, in a frequency band below 6 GHz, 3 bits obtained through decoding of the PBCH DMRS indicate the synchronization signal block index and, in a frequency band above 6 GHz, 6 bits in total, including 3 bits obtained through decoding of the PBCH DMRS and 3 bits included in the PBCH payload and obtained by PBCH decoding may indicate the synchronization signal block index including the PBCH.

Physical downlink control channel (PDCCH) configuration information: —the subcarrier spacing of the common downlink control channel may be indicated through 1 bit (subCarrierSpacingCommon) in the MIB, and the time-frequency resource configuration information of the search space (SS) and the control resource set (CORESET) may be indicated through 8 bits (pdcch-ConfigSIB1).

System frame number (SFN): 6 bits (systemFrameNumber) in the MIB may be used to indicate a part of the SFN. The 4 least significant bits (LSBs) of the SFN are included in the PBCH payload, and the UE may indirectly obtain it through PBCH decoding.

Timing information in the radio frame: 1 bit (half frame) obtained through PBCH decoding and included in the PBCH payload and the synchronization signal block index described above. The UE may indirectly identify whether the synchronization signal block is transmitted in the first or second half frame of the radio frame.

Since the transmission bandwidth (12 RBs 305) of the PSS 301 and the SSS 303 and the transmission bandwidth (24 RBs 306) of the PBCH 302 are different from each other, the first OFDM symbol where the PSS 301 is transmitted in the PBCH (302) transmission bandwidth has 6 RBs 307 and 308 on both sides except the intermediate 12 RBs where the PSS 301 is transmitted, and the region may be used to transmit other signals or may be empty.

The synchronization signal blocks may be transmitted using the same analog beam. For example, the PSS 301, the SSS 303, and the PBCH 302 may all be transmitted through the same beam. Since the analog beam, by its nature, cannot be applied differently on the frequency axis, the same analog beam may be applied to all the RBs on the frequency axis RBs within a specific OFDM symbol to which a specific analog beam is applied. For example, all of the four OFDM symbols in which the PSS 301, the SSS 303, and the PBCH 302 are transmitted may be transmitted using the same analog beam.

Figure 4:
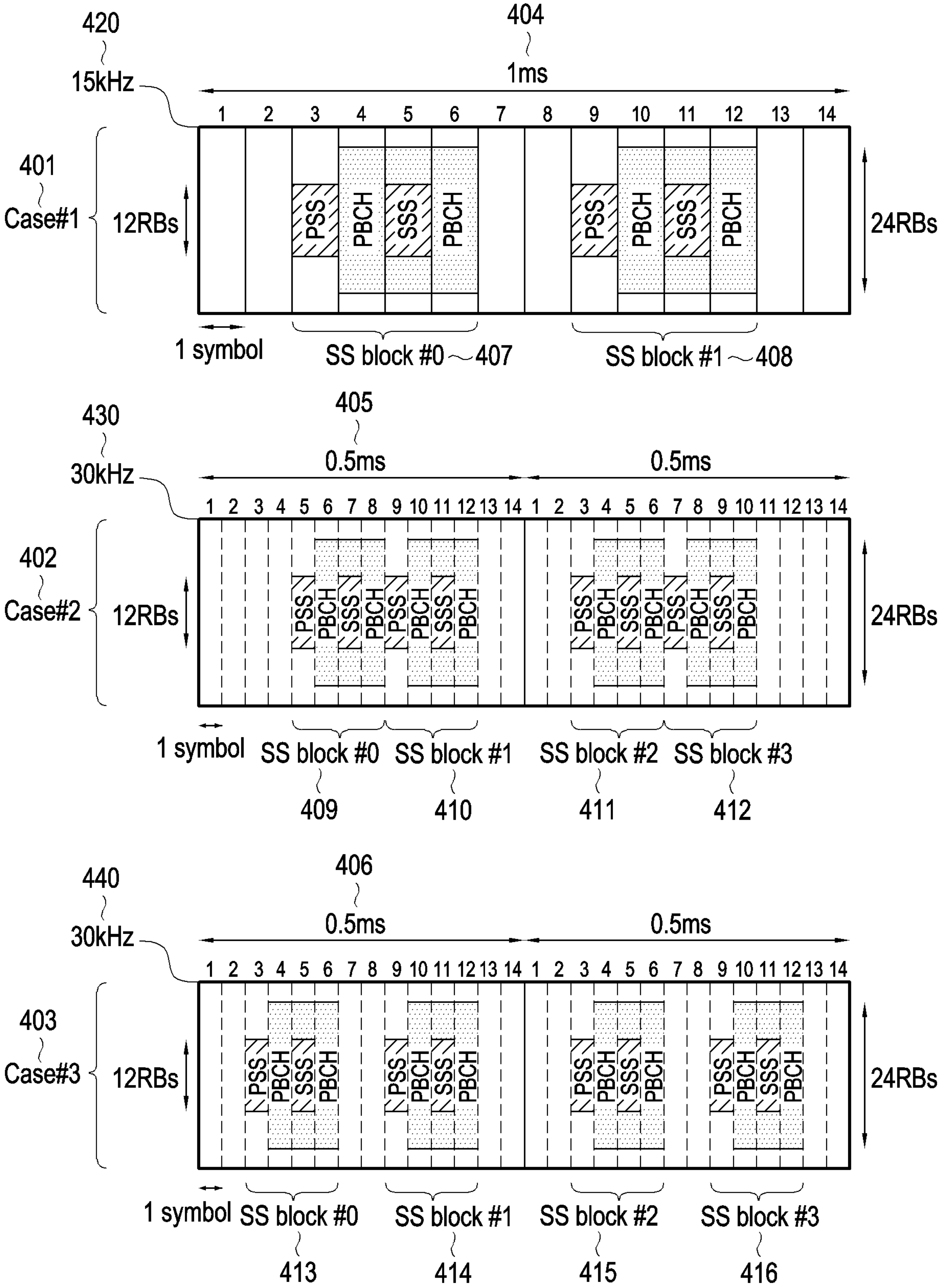
FIG. 4 is a view illustrating transmission cases of a synchronization signal block in a frequency band of less than 6 GHz considered in a wireless communication system according to an embodiment.

FIG. 4 is a view illustrating transmission cases of a synchronization signal block in a frequency band of less than 6 GHz considered in a communication system according to an embodiment.

Referring to FIG. 4, in the 5G communication system, in a frequency band below 6 GHZ, a subcarrier spacing (SCS) 420 of 15 kHz and a subcarrier spacing of 30 kHz (430 or 440) may be used for synchronization signal block transmission. In the 15 kHz subcarrier spacing 420, there is one transmission case (e.g., Case #1 (401)) for the synchronization signal block and, in the 30 kHz subcarrier spacing 430 or 440, there may be two transmission cases for the synchronization signal block (e.g., Case #2 (402) and Case #3 403).

In FIG. 4, in case #1 (401) of the 15 kHz subcarrier spacing (420), up to two synchronization signal blocks may be transmitted within 1 ms (404) (or, when 1 slot consists of 14 OFDM symbols, it corresponds to a length of 1 slot). In the example of FIG. 4, synchronization signal block #0 407 and synchronization signal block #1 408 are shown. For example, the synchronization signal block #0 407 may be mapped to four consecutive symbols from the third OFDM symbol, and the synchronization signal block #1 408 may be mapped to four consecutive symbols from the ninth OFDM symbol.

Different analog beams may be applied to the synchronization signal block #0 407 and the synchronization signal block #1 408. The same beam may be applied to all of the 3rd to 6th OFDM symbols to which synchronization signal block #0 407 is mapped, and the same beam may be applied to all of the 9th to 12th OFDM symbols to which synchronization signal block #1 408 is mapped. In the 7th, 8th, 13th, and 14th OFDM symbols to which no synchronization signal block is mapped, an analog beam to be used may be freely determined under the determination of the base station.

In FIG. 4, in case #2 (402) of the 30 kHz subcarrier spacing (430), up to two synchronization signal blocks may be transmitted within 0.5 ms (405) (or, when 1 slot consists of 14 OFDM symbols, it corresponds to a length of 1 slot), and accordingly, up to four synchronization signal blocks may be transmitted within 1 ms (or, if 1 slot consists of 14 OFDM symbols, it corresponds to a length of 2 slots). FIG. 4 illustrates an example in which synchronization signal block #0 409, synchronization signal block #1 410, synchronization signal block #2 411, and synchronization signal block #3 412 are transmitted within 1 ms (i.e., two slots). Synchronization signal block #0 409 and synchronization signal block #1 410 may be mapped from the fifth OFDM symbol and the ninth OFDM symbol, respectively, of the first slot. Synchronization signal block #2 411 and synchronization signal block #3 412 may be mapped from the third OFDM symbol and the seventh OFDM symbol, respectively, of the second slot.

Different analog beams may be applied to synchronization signal block #0 409, synchronization signal block #1 410, synchronization signal block #2 411, and synchronization signal block #3 412. The same analog beam may be applied to the 5th to 8th OFDM symbols of the first slot in which synchronization signal block #0 409 is transmitted, the 9th to 12th OFDM symbols of the first slot in which synchronization signal block #1 410 is transmitted, the 3rd to 6th symbols of the second slot in which synchronization signal block #2 411 is transmitted, and the 7th to 10th symbols of the second slot in which synchronization signal block #3 412 is transmitted. In the OFDM symbols to which no synchronization signal block is mapped, an analog beam to be used may be freely determined under the determination of the base station.

In FIG. 4, in case #3 (403) of the 30 kHz subcarrier spacing (440), up to two synchronization signal blocks may be transmitted within 0.5 ms (406) (or, when 1 slot consists of 14 OFDM symbols, it corresponds to a length of 1 slot), and accordingly, up to four synchronization signal blocks may be transmitted within 1 ms (or, if 1 slot consists of 14 OFDM symbols, it corresponds to a length of 2 slots). FIG. 4 illustrates an example in which synchronization signal block #0 413, synchronization signal block #1 414, synchronization signal block #2 415, and synchronization signal block #3 416 are transmitted within 1 ms (i.e., two slots). Synchronization signal block #0 413 and synchronization signal block #1 414 may be mapped from the 3rd OFDM symbol and the 9th OFDM symbol, respectively, of the first slot, and synchronization signal block #2 415 and synchronization signal block #3 416 may be mapped from the 3rd OFDM symbol and the 9th OFDM symbol, respectively, of the second slot.

Different analog beams may be used for synchronization signal block #0 413, synchronization signal block #1 414, synchronization signal block #2 415, and synchronization signal block #3 416. As described above in connection with examples, the same analog beam may be used in all four OFDM symbols in which each synchronization signal block is transmitted, and which beam is used in OFDM symbols to which no synchronization signal block is mapped may be freely determined by the base station.

Figure 5:
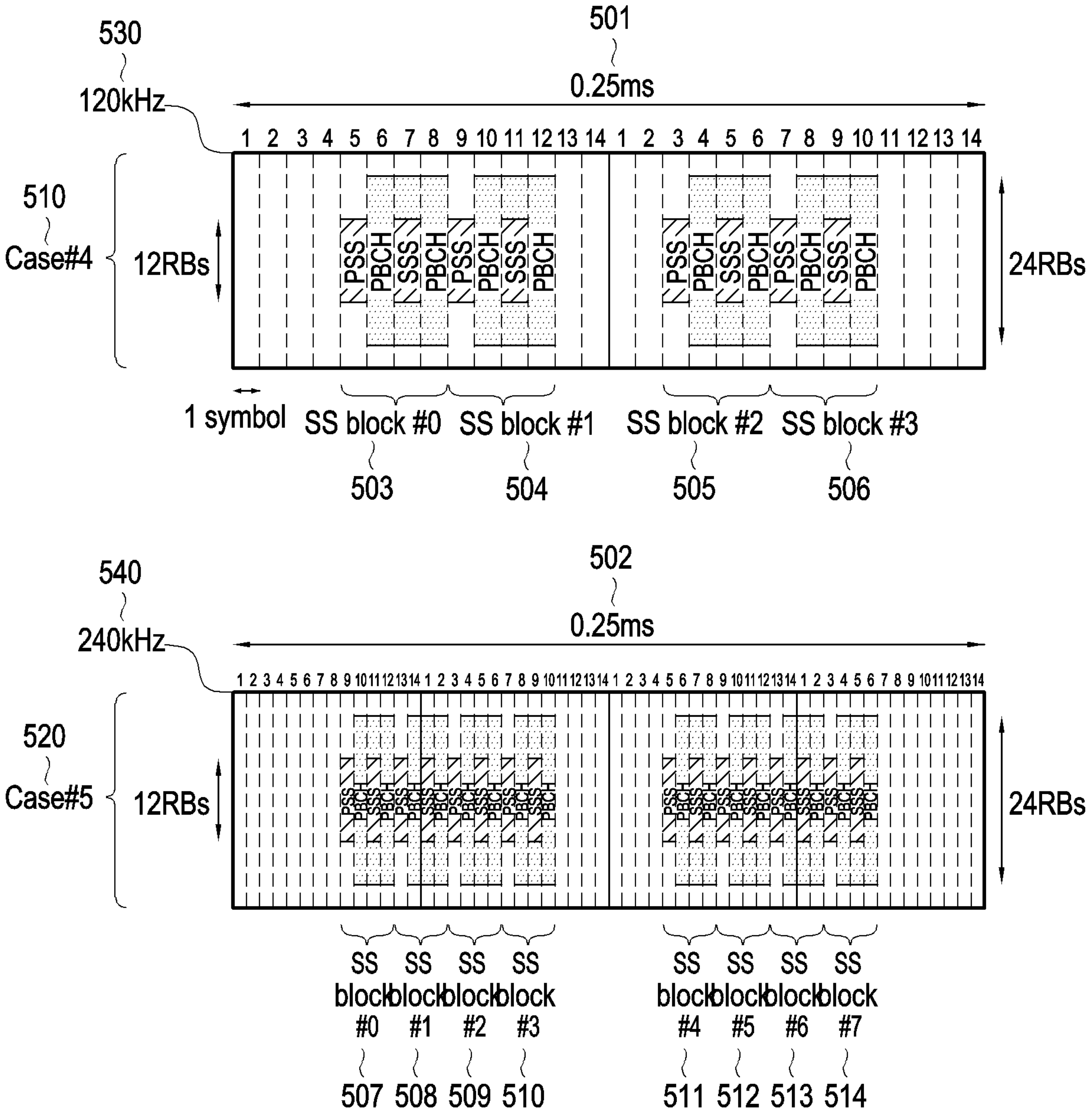
FIG. 5 is a view illustrating transmission cases of a synchronization signal block in a frequency band of 6 GHz or higher considered in a wireless communication system according to an embodiment.

FIG. 5 is a view illustrating transmission cases of a synchronization signal block in a frequency band of 6 GHz or higher considered in a wireless communication system according to an embodiment.

Referring to FIG. 5, in the 5G communication system, in a frequency band of 6 GHz or higher, the sub-carrier spacing of 120 kHz (530) as in the example of case #4 (510) and the sub-carrier spacing of 240 kHz (540) as in the example of case #5 (520) may be used for synchronization signal block transmission.

In case #4 (510) of the 120 kHz subcarrier spacing (530), up to four synchronization signal blocks may be transmitted within 0.25 ms (501) (or, when 1 slot consists of 14 OFDM symbols, it corresponds to a length of 2 slots). FIG. 5 illustrates an example in which synchronization signal block #0 503, synchronization signal block #1 504, synchronization signal block #2 505, and synchronization signal block #3 506 are transmitted within 0.25 ms (i.e., two slots). Synchronization signal block #0 503 and synchronization signal block #1 504 may be mapped to four consecutive symbols from the 5th OFDM symbol and to four consecutive symbols from the 9th OFDM symbol, respectively, of the first slot, and synchronization signal block #2 505 and synchronization signal block #3 506 may be mapped to four consecutive symbols from the 3rd OFDM symbol and to four consecutive symbols from the 7th OFDM symbol, respectively, of the second slot.

As described above in connection with the above embodiments, different analog beams may be used for synchronization signal block #0 503, synchronization signal block #1 504, synchronization signal block #2 505, and synchronization signal block #3 506. The same analog beam may be used in all four OFDM symbols in which each synchronization signal block is transmitted, and which beam is used in OFDM symbols to which no synchronization signal block is mapped may be freely determined by the base station.

In case #1 (520) of the 240 kHz subcarrier spacing (540), up to eight synchronization signal blocks may be transmitted within 0.25 ms (502) (or, when 1 slot consists of 14 OFDM symbols, it corresponds to a length of 4 slots). FIG. 5 illustrates an example in which synchronization signal block #0 (507), synchronization signal block #1 (508), synchronization signal block #2 (509), synchronization signal block #3 (510), synchronization signal block #4 (511), synchronization signal block #5 (512), synchronization signal block #6 (513), and synchronization signal block #7 (514) are transmitted within 0.25 ms (i.e., 4 slots).

Synchronization signal block #0 (507) and synchronization signal block #1 (508) may be mapped to four consecutive symbols from the 9th OFDM symbol and to four consecutive symbols from the 13th OFDM symbol, respectively, of the first slot, synchronization signal block #2 (509) and synchronization signal block #3 (510) may be mapped to four consecutive symbols from the 3rd OFDM symbol and to four consecutive symbols from the 7th OFDM symbol, respectively, of the second slot, synchronization signal block #4 (511), synchronization signal block #5 512, and synchronization signal block #6 (513) may be mapped to four consecutive symbols from the 5th OFDM symbol, to four consecutive symbols from the 9th OFDM symbols, and to four consecutive symbols from the 13th OFDM symbol, respectively, of the third slot, and synchronization signal block #7 514 may be mapped to four consecutive symbols from the 3rd OFDM symbol of the fourth slot.

As described in connection with the above embodiment, synchronization signal block #0 (507), synchronization signal block #1 (508), synchronization signal block #2 (509), synchronization signal block #3 (510), synchronization signal block #4 (511), synchronization signal block #5 (512), synchronization signal block #6 (513), and synchronization signal block #7 (514) may use different analog beams. The same analog beam may be used in all four OFDM symbols in which each synchronization signal block is transmitted, and which beam is used in OFDM symbols to which no synchronization signal block is mapped may be freely determined by the base station.

Figure 6:
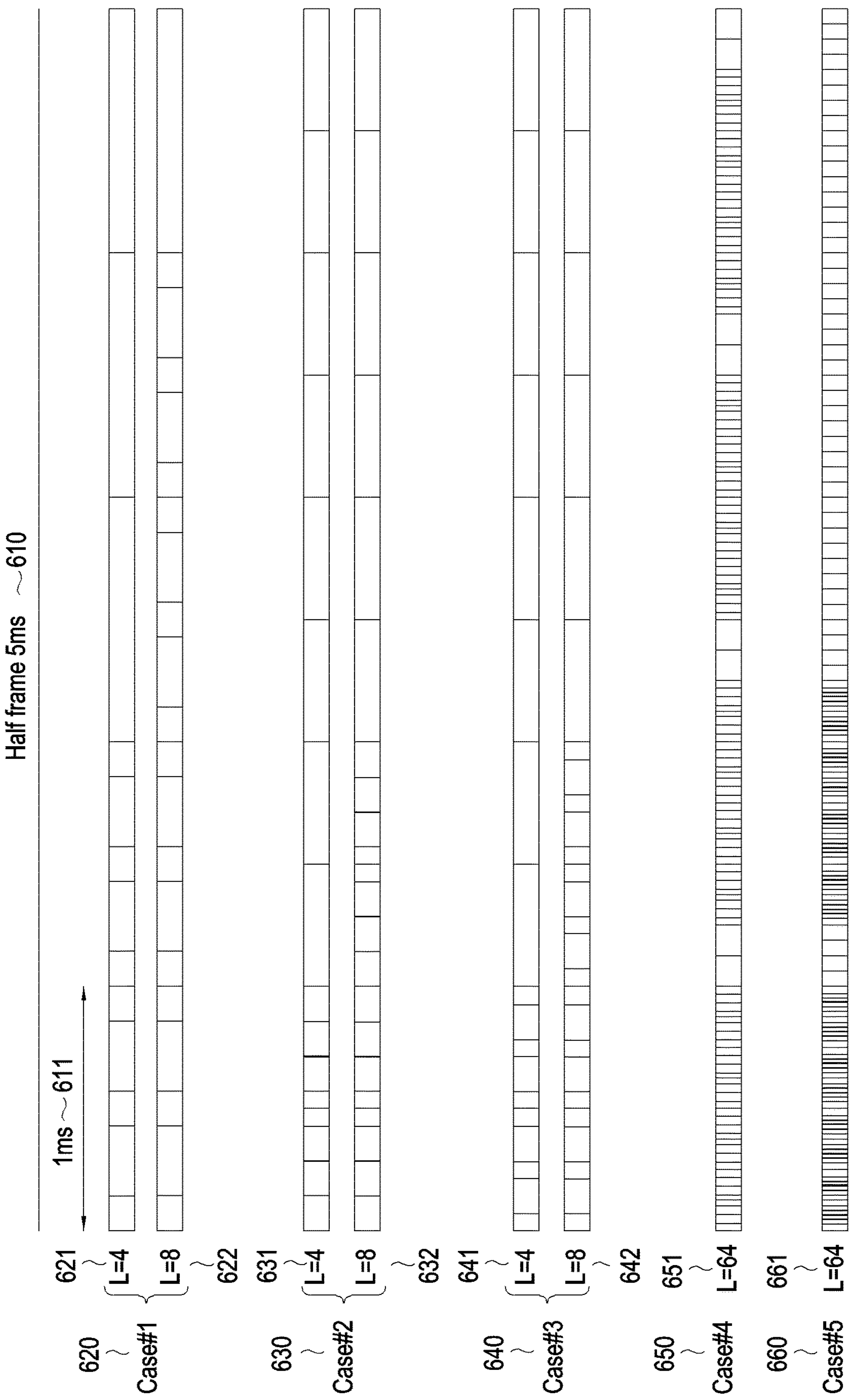
FIG. 6 is a view illustrating transmission cases of a synchronization signal block according to a subcarrier spacing within 5 ms in a wireless communication system according to an embodiment.

FIG. 6 is a view illustrating transmission cases of a synchronization signal block according to a subcarrier spacing within 5 ms in a wireless communication system according to an embodiment.

Referring to FIG. 6, in the 5G communication system, synchronization signal blocks may be transmitted periodically, e.g., every time interval 610 of 5 ms (corresponding to five subframes or a half frame).

In a frequency band of 3 GHz or less, up to four synchronization signal blocks may be transmitted within 5 ms (610). Up to 8 synchronization signal blocks may be transmitted in a frequency band above 3 GHz and below 6 GHz. In a frequency band above 6 GHz, up to 64 synchronization signal blocks may be transmitted. As described above, the subcarrier spacings of 15 kHz and 30 kHz may be used at frequencies below 6 GHz.

In the example of FIG. 6, in case #1 (401) of the 15 kHz subcarrier spacing consisting of one slot of FIG. 4, in a frequency band of 3 GHz or less, synchronization signal blocks may be mapped to the first slot and the second slot so that up to four synchronization signal blocks 621 may be transmitted, may be transmitted, and in a frequency band above 3 GHz and below 6 GHz, synchronization signal blocks may be mapped to the first, second, third, and fourth slots, so that up to eight synchronization signal blocks 622 may be transmitted. In case #2 (402) or case #3 (403) of the 30 kHz subcarrier spacing consisting of two slots in FIG. 4, in a frequency band below 3 GHZ, synchronization signal blocks may be mapped starting from the first slot, so that up to four synchronization signal blocks 631 and 641 may be transmitted, and in a frequency band above 3 GHz and below 6 GHz, synchronization signal blocks may be mapped starting from the first and third slots, so that up to eight synchronization signal blocks 632 and 642 may be transmitted.

The subcarrier spacings of 120 kHz and 240 kHz may be used at frequencies above 6 GHz. In the example of FIG. 6, in case #4 (510) of the 120 kHz subcarrier spacing consisting of two slots of FIG. 5, in a frequency band above 6 GHz, synchronization signal blocks may be mapped starting from 1st, 3rd, 5th, 7th, 11th, 13th, 15th, 17th, 21st, 23rd, 25th, 27th, 31rd, 33rd, 35th, and 37th slots so that up to 64 synchronization signal blocks 651 may be transmitted. In the example of FIG. 6, in case #5 (520) of the 240 kHz subcarrier spacing consisting of 4 slots of FIG. 5, in a frequency band above 6 GHz, synchronization signal blocks may be mapped starting from the 1st, 5th, 9th, 13rd, 21st, 25th, 29th, and 33rd slots so that up to 64 synchronization signal blocks 661 may be transmitted.

The UE may obtain the SIB after decoding the PDCCH and the PDSCH based on the system information included in the received MIB. The SIB may include at least one of uplink cell bandwidth-related information, random access parameters, paging parameters, or parameters related to uplink power control.

In general, the UE may form a radio link with the network through a random access procedure based on the system information and synchronization with the network obtained in the cell search process of the cell. For random access, a contention-based or contention-free scheme may be used. When the UE performs cell selection and reselection in the phase of initial access to the cell, a contention-based random access scheme may be used for the purpose of, e.g., switching from the RRC_IDLE (RRC idle) state to the RRC_CONNECTED (RRC connected) state. Contention-free random access may be used when downlink data arrives, in the case of handover, or for re-establishing uplink synchronization for location measurement. Table 3 below illustrates conditions (events) under which a random access procedure is triggered in the 5G system.

TABLE 3

- Initial access from RRC_IDLE;
- RRC Connection Re-establishment procedure;
- DL or UL data arrival during RRC_CONNECTED when UL synchronisation status is "non-synchronised";
- UL data arrival during RRC_CONNECTED when there are no PUCCH resources for SR available;
- SR failure;
- Request by RRC upon synchronous reconfiguration (e.g. handover);
- RRC Connection Resume procedure from RRC_INACTIVE;
- To establish time alignment for a secondary TAG;
- Request for Other SI;
- Beam failure recovery;
- Consistent UL LBT failure on SpCell.

Hereinafter, setting a measurement time for radio resource management (RRM) based on a synchronization signal block (SS block or SSB) of a 5G wireless communication system is described.

The UE receives MeasObjectNR of MeasObjectToAddModlist as configurations for SSB-based intra/inter-frequency measurements and CSI-RS-based intra/inter-frequency measurements through higher layer signaling. For example, MeasObjectNR may be configured as shown in Table 4 below.

TABLE 4

```
MeasObjectNR ::=                          SEQUENCE {
  ssbFrequency                                  ARFCN-ValueNR
OPTIONAL, -- Cond SSBorAssociatedSSB
  ssbSubcarrierSpacing                          SubcarrierSpacing
OPTIONAL, -- Cond SSBorAssociatedSSB
  smtc1                                         SSB-MTC
OPTIONAL, -- Cond SSBorAssociatedSSB
  smtc2                                         SSB-MTC2
OPTIONAL, -- Cond IntraFreqConnected
  refFreqCSI-RS                                 ARFCN-ValueNR
OPTIONAL, -- Cond CSI-RS
  referenceSignalConfig                     ReferenceSignalConfig,
  absThreshSS-BlocksConsolidation               ThresholdNR
OPTIONAL, -- Need R
  absThreshCSI-RS-Consolidation                 ThresholdNR
OPTIONAL, -- Need R
  nrofCSI-RS-ResourcesToAverage               INTEGER (2..maxNrofCSI-RS-
ResourcesToAverage)                         OPTIONAL, -- Need R
  quantityConfigIndex                        INTEGER (1..maxNrofQuantityConfig),
  offsetMO                                     Q-OffsetRangeList,
  cellsToRemoveList                                PCI-List
OPTIONAL, -- Need N
  cellsToAddModList                             CellsToAddModList
OPTIONAL, -- Need N
  blackCellsToRemoveList                        PCI-RangeIndexList
OPTIONAL, -- Need N
  blackCellsToAddModList                     SEQUENCE(SIZE(1..maxNrofPCI-Ranges))
OF PCI-RangeElement                       OPTIONAL, -- Need N
  whiteCellsToRemoveList                        PCI-RangeIndexList
OPTIONAL, -- Need N
  whiteCellsToAddModList                     SEQUENCE(SIZE(1..maxNrofPCI-Ranges))
OF PCI-RangeElement                       OPTIONAL, -- Need N
  ...,
  [[
  freqBandIndicatorNR                           FreqBandIndicatorNR
```

TABLE 4-continued

```
OPTIONAL, -- Need R
  measCycleSCell                    ENUMERATED {sf160, sf256, sf320, sf512,
sf640, sf1024, sf1280}           OPTIONAL -- Need R
  ]],
  [[
  smtc3list-r16                          SSB-MTC3List-r16
OPTIONAL, -- Need R
  rmtc-Config-r16                   SetupRelease {RMTC-Config-r16}
OPTIONAL, -- Need M
  t312-r16                            SetupRelease { T312-r16 }
OPTIONAL -- Need M
  ]]
}
```

ssbFrequency: may indicate the frequency of the synchronization signal related to MeasObjectNR.

ssbSubcarrierSpacing: indicates the subcarrier spacing of SSB. FR1 may only apply 15 kHz or 30 kHz, and FR2 may only apply 120 kHz or 240 KHz.

smtc1: indicates the SS/PBCH block measurement timing configuration, and may set the primary measurement timing configuration and set the timing offset and duration for SSB.

smtc2: may indicate the secondary measurement timing configuration for SSB related to MeasObjectNR with the PCI listed in the pci-List.

It may also be configured through other higher layer signaling. For example, the SMTC may be configured in the UE through reconfigurationWithSync for NR PSCell change or NR PCell change or SIB2 for intra-frequency, inter-frequency, and inter-RAT cell reselection. Further, the SMTC may be configured in the UE through SCellConfig for adding an NR SCell.

The UE may configure the first SS/PBCH block measurement timing configuration (SMTC) according to the periodicity AndOffset (providing periodicity and offset) through smtc1 configured through higher layer signaling for SSB measurement. In an embodiment, the first subframe of each SMTC occasion may start in the subframe of SpCell and the system frame number (SFN) meeting the conditions of Table 5.

TABLE 5

```
SFN mod T = (FLOOR (Offset/10));
if the Periodicity is larger than sf5:
  subframe = Offset mod 10;
else:
  subframe = Offset or (Offset +5);
with T = CEIL(Periodicity/10).
```

If smtc2 is set, the UE may configure an additional SMTC according to the offset and duration of smtc1 and the periodicity of smtc2 configured, for the cells indicated by the pci-List value of smtc2 in the same MeasObjectNR. In addition, the UE may have the smtc configured thereto through the smtc3list for smtc2-LP (with long periodicity) and integrated access and backhaul-mobile termination (IAB-MT) for the same frequency (e.g., frequency for intra frequency cell reselection) or other frequencies (e.g., frequencies for inter frequency cell reselection) and may measure the SSB. In an embodiment, the UE may not consider the SSB transmitted in a subframe other than the SMTC occasion for SSB-based RRM measurement at the configured ssbFrequency.

The base station may use various multi-transmit/receive point (mTRP) operation methods depending on the serving cell configuration and physical cell identifier (PCI) configuration. Among them, there may be two methods for operating the two TRPs when two TRPs positioned in a distance physically away from each other have different PCIs.

Operation Method 1

The two TRPs having different PCIs may be operated as two serving cell configurations.

The base station may include the channels and signals transmitted in different TRPs through operation method 1 in different serving cell configurations and configure them. In other words, each TRP may have an independent serving cell, and frequency bandwidth value Frequency InfoDLs indicated by the DownlinkConfigCommon in the serving cell configurations may indicate bands that at least partially overlap each other. Since the several TRPs operate based on multiple ServCellIndexes (e.g., ServCellIndex #1 and ServCellIndex #2), each TRP may use a separate PCI. In other words, the base station may assign one PCI to each ServCellIndex.

In this case, when several SSBs are transmitted in TRP 1 and TRP 2, the SSBs may have different PCIs (e.g., PCI #1 and PCI #2), and the base station may properly select the ServCellIndex value indicated by the cell parameter in QCL-Info, map the PCI suitable for each TRP, and designate the SSB transmitted in either TRP 1 or TRP 2 as the source reference RS of the QCL configuration information. However, this configuration is to apply one serving cell configuration available for carrier aggregation (CA) to multiple TRPs and may thus restrict the degree of freedom of the CA configuration or increase signaling loads.

Operation Method 2

The two TRPs having different PCIs may be operated as one serving cell configuration.

The base station may configure the channels and signals transmitted in different TRPs through operation method 2 through one serving cell configuration. Since the UE operates based on one ServCellindex (e.g., ServCellindex #1), it is impossible to recognize the PCI assigned to the second TRP (e.g., PCI #2). Operation method 1 may have a degree of freedom of CA configuration as compared with operation method 1 described above. However, when several SSBs are transmitted in TRP 1 and TRP 2, the SSBs may have different PCIs (e.g., PCI #1 and PCI #2), and the base station may not be able to map the PCI (e.g., PCI #2) of the second TRP through the ServCellIndex indicated by the cell parameter in QCL-Info. The base station may only designate the SSB transmitted in TRP 1 with the source reference RS of the QCL configuration information and may not be able to designate the SSB transmitted in TRP 2.

As described above, operation method 1 may perform multi-TRP operation for two TRPs having different PCIs through an additional serving cell configuration without support of additional specifications, but operation method 2 may operate based on the following additional UE capability report and base station configuration information.

Regarding UE Capability Report for Operation Method 2

The UE may report, to the base station, through UE capability, that it is possible to configure the PCI of the serving cell and another additional PCI through higher layer signaling from the base station. The UE capability may include X1 and X2 which are numbers independent of each other, or X1 and X2 may be reported as independent UE capabilities.

X1 means the maximum number of additional PCIs configurable to the UE. The PCI may be different from the PCI of the serving cell and, in this case, may mean the case where the time domain position and periodicity of the SSB corresponding to the additional PCI are the same as those of the SSB of the serving cell.

X2 means the maximum number of additional PCIs configurable to the UE. In this case, the PCI may be different from the PCI of the serving cell and, in this case, may mean the case where the time domain position and periodicity of the SSB corresponding to the additional PCI are different from those of the SSB corresponding to the PCI reported as X1.

By definition, the PCIs corresponding to the values reported as X1 and X2 may not be configured simultaneously with each other.

The values reported as X1 and X2 reported through the UE capability report may each have a value of one integer from 0 to 7.

The values reported as X1 and X2 may be reported as different values in FR1 and FR2.

Regarding Higher Layer Signaling Configuration for Operation Method 2

The UE may have SSB-MTCAdditionalPCI-r17, which is higher layer signaling, configured thereto by the base station based on the above-described UE capability report. The higher layer signaling may include a plurality of additional PCIs having different values from, at least, the serving cell, the SSB transmission power corresponding to each additional PCI, and ssb-PositionInBurst corresponding to each additional PCI. The maximum number of additional PCIs configurable may be seven.

The UE may be assumed to have the same center frequency, subcarrier spacing, and subframe number offset as those of the serving cell as an assumption for the SSB configured to an additional PCI having a different value from that of the serving cell.

The UE may assume that the reference RS (e.g., SSB or CSI-RS) corresponding to the PCI of the serving cell is connected to the always-active TCI state. When there are one or more additionally configured PCIs having a value different from the serving cell, only one PCI among the PCIs may be assumed to be connected to the activated TCI state.

When the UE has two different corsesetPoolIndexes configured thereto, the reference RS corresponding to the serving cell PCI is connected to one or more activated TCI states, and the reference RS corresponding to the additionally configured PCI having a different value from that of the serving cell is connected to one or more activated TCI states, the UE may expect that the activated TCI state(s) connected with the serving cell PCI are connected to one of the two coresetPoolIndexes, and the activated TCI state(s) connected with the additionally configured PCI having a different value from that of the serving cell are connected to the remaining one coresetPoolIndex.

UE capability reporting and base station higher layer signaling for operation method 2 described above may configure an additional PCI having a value different from that of the PCI of the serving cell. When the configuration is absent, the SSB corresponding to the additional PCI having a different value from the PCI of the serving cell which may not be designated by the source reference RS may be used for the purpose of designating the source reference RS of the QCL configuration information. Further, unlike the SSB configurable for use for the purpose of RRM, mobility, or handover, such as the configuration information about the SSB configurable in smtc1 and smtc2 which is the higher layer signaling, it may be used to serve as a QCL source RS for supporting multi-TRP operations having different PCIs.

Next, a demodulation reference signal (DMRS) which is a reference signal in the 5G system is described.

The DMRS may be composed of several DMRS ports. The ports maintain orthogonality not to interfere with each other using code division multiplexing (CDM) or frequency division multiplexing (FDM). However, the term "DMRS" may be replaced with a different term depending on the user's intent or the purpose of use of the reference signal. The term "DMRS" is provided merely for better understanding of the disclosure, and the present invention should not be limited thereto or thereby. In other words, it will be apparent to one of ordinary skill in the art that it may be applied to any reference signal based on the technical spirit of the disclosure.

Figure 7:
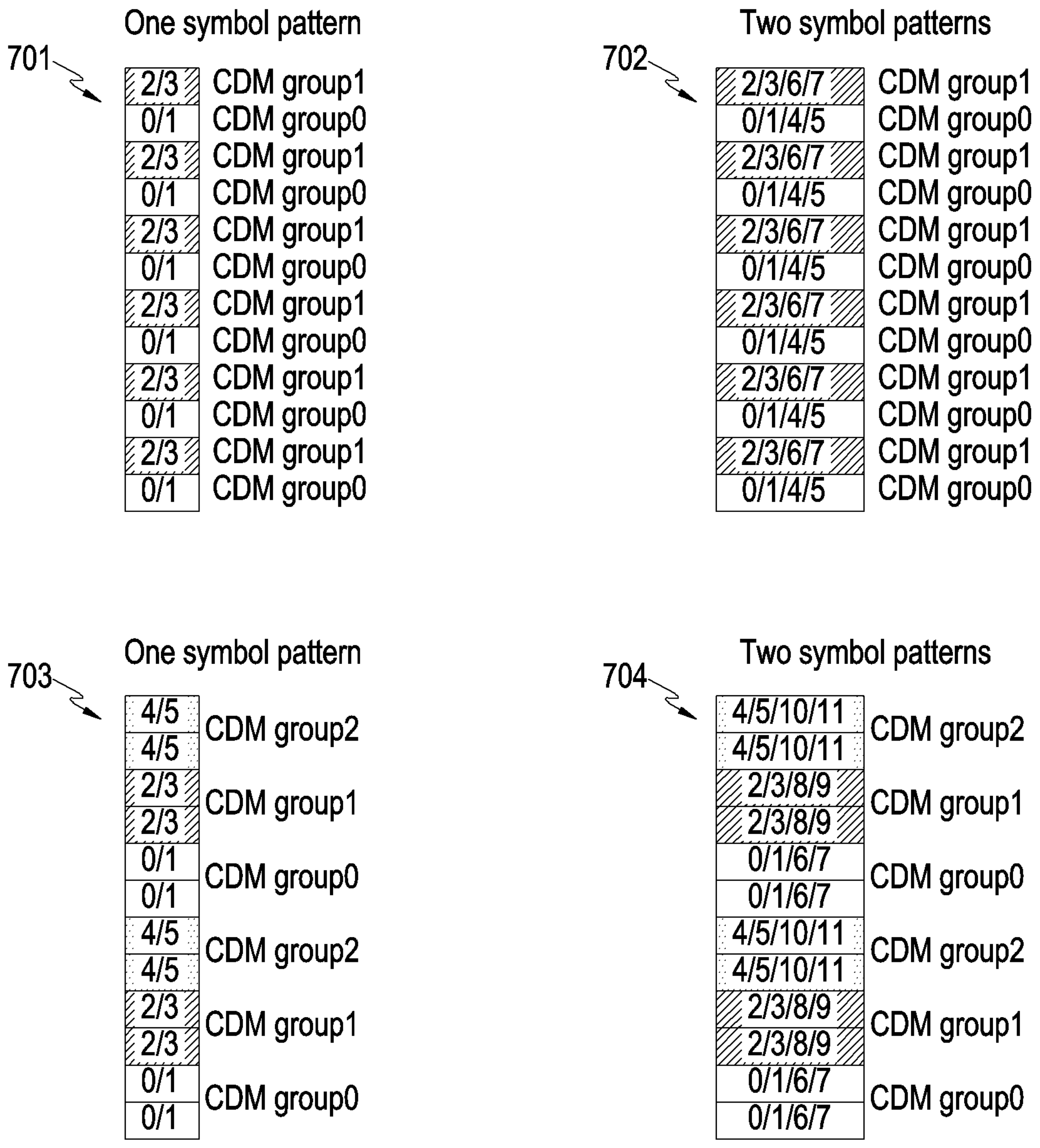
FIG. 7 is a view illustrating a DMRS pattern (type 1 and type 2) used for communication between base station and UE in a 5G system.

FIG. 7 is a view illustrating a DMRS pattern (type 1 and type 2) used for communication between base station and UE in a 5G system. In the 5G system, two DMRS patterns may be supported. FIG. 3 illustrates two DMRS patterns.

Referring to FIG. 7, reference numerals 701 and 702 correspond to DMRS type 1, where reference numeral 701 denotes a 1 symbol pattern and reference numeral 702 denotes a 2 symbol pattern. DMRS type 1 of reference numerals 701 and 702 is a comb 2-structure DMRS pattern and may be composed of two CDM groups. The different CDM groups may be FDMed.

In the 1 symbol pattern 701, frequency CDM is applied to the same CDM group, distinguishing the two DMRS ports. Therefore, a total of 4 orthogonal DMRS ports may be configured. The 1 symbol pattern 701 may include a DMRS port ID mapped to each CDM group (DMRS port ID for downlink may be represented by the shown+number 1000). In the 2 symbol pattern 702, time/frequency CDM is applied to the same CDM group, distinguishing the four DMRS ports. Therefore, a total of 8 orthogonal DMRS ports may be configured. The 2 symbol pattern 702 may include a DMRS port ID mapped to each CDM group (DMRS port ID for downlink may be represented by the shown+number 1000).

DMRS type2 indicated by reference numerals 703 and 704 is a DMRS pattern having a structure in which frequency domain orthogonal cover codes (FD-OCC) are applied to subcarriers adjacent in frequency, and may be composed of three CDM groups. The different CDM groups may be FDMed.

In the 1 symbol pattern 703, frequency CDM is applied to the same CDM group, distinguishing the two DMRS ports. Therefore, a total of 6 orthogonal DMRS ports may be configured. The 1 symbol pattern 703 may include a DMRS port ID mapped to each CDM group (DMRS port ID for downlink may be represented by the shown+number 1000). In the 2 symbol pattern 704, time/frequency CDM is applied to the same CDM group, distinguishing the four DMRS ports. Therefore, a total of 12 orthogonal DMRS ports may be configured. The 2 symbol pattern 704 may include a DMRS port ID mapped to each CDM group (DMRS port ID for downlink may be represented by the shown+number 1000).

As described above, in the NR system, two different DMRS patterns (e.g., DMRS patterns 701 and 702 or DMRS patterns 703 and 704) may be configured. Whether each DMRS pattern is a one symbol pattern 701 or 703 or an adjacent-two-symbol pattern 702 or 704 may also be set. Further, in the NR system, not only DMRS port numbers are scheduled, but also the number of CDM groups scheduled together may be configured and signaled for PDSCH rate matching. Further, in the case of cyclic prefix based orthogonal frequency division multiplex (CP-OFDM), both the DMRS patterns described above may be supported in DL and UL. In the case of discrete Fourier transform spread OFDM (DFT-S-OFDM), only DMRS type1 among the DMRS patterns described above may be supported in UL.

Further, it may be supported to configure additional DMRSs. Front-loaded DMRS may refer to the first DMRS transmitted/received in the first symbol in the time domain among DMRSs, and additional DMRS refers to a DMRS transmitted/received in a symbol behind the front-loaded DMRS in the time domain. In the NR system, the number of additional DMRSs may be configured from a minimum of 0 to a maximum of 3. Further, when an additional DMRS is configured, the same pattern as the front-loaded DMRS may be assumed. In an embodiment, information about whether the DMRS pattern type described above for the front-loaded DMRS is type 1 or type 2, information about whether the DMRS pattern is a one-symbol pattern or an adjacent-two-symbol pattern, and information about the number of DMRS ports and used CDM groups, when an additional DMRS is further configured, it may be assumed that the additional DMRS has the same DMRS information as the front-loaded DMRS configured.

In an embodiment, the downlink DMRS configuration described above may be configured through RRC signaling as shown in Table 6.

TABLE 6

```
DMRS-DownlinkConfig ::=          SEQUENCE {
   dmrs-Type                     ENUMERATED {type2}        OPTIONAL, -- Need S
   dmrs-AdditionalPosition       ENUMERATED {pos0,         OPTIONAL, -- Need S
                                 pos1, pos3}
   maxLength                     ENUMERATED {len2}         OPTIONAL, -- Need S
   scramblingID0                 INTEGER (0..65535)        OPTIONAL, -- Need S
   scramblingID1                 INTEGER (0..65535)        OPTIONAL, -- Need S
   phaseTrackingRS               SetupRelease              OPTIONAL, -- Need M
                                 {PTRS-DownlinkConfig}
      ...,
}
```

Here, dmrs-type may indicate the DMRS type, dmrs-AdditionalPosition may indicate additional DMRS OFDM symbols, maxLength may indicate 1 symbol DMRS pattern or 2 symbol DMRS pattern, scramblingID0 and scramblingID1 may indicate scrambling IDs, and phaseTrackingRS may indicate a phase tracking reference signal (PTRS).

Further, the uplink DMRS configuration described above may be configured through RRC signaling as shown in Table 7.

TABLE 7

```
DMRS-UplinkConfig ::=            SEQUENCE {
   dmrs-Type                     ENUMERATED {type2}                  OPTIONAL, -- Need S
   dmrs-AdditionalPosition       ENUMERATED {pos0, pos1, pos3}       OPTIONAL, -- Need R
   phaseTrackingRS               SetupRelease { PTRS-UplinkConfig }  OPTIONAL, -- Need M
   maxLength                     ENUMERATED {len2}                   OPTIONAL, -- Need S
   transformPrecodingDisabled    SEQUENCE {
      scramblingID0              INTEGER (0..65535)                  OPTIONAL, -- Need S
      scramblingID1              INTEGER (0..65535)                  OPTIONAL, -- Need S
      ...
   }                                                                 OPTIONAL, -- Need R
   transformPrecodingEnabled     SEQUENCE {
      nPUSCH-Identity            INTEGER (0..1007)                   OPTIONAL, -- Need S
      sequenceGroupHopping       ENUMERATED {disabled}               OPTIONAL, -- Need S
      sequenceHopping            ENUMERATED {enabled}                OPTIONAL, -- Need S
      ...
   }                                                                 OPTIONAL, -- Need R
   ...
}
```

Here, dmrs-Type may indicate the DMRS type, dmrs-AdditionalPosition may indicate additional DMRS OFDM symbols, phaseTrackingRS may indicate PTRS, and maxLength may indicate 1 symbol DMRS pattern or 2 symbol DMRS pattern. scramblingID0 and scramblingID1 may indicate scrambling IDOs, and nPUSCH-Identity may indicate the cell ID for DFT-s-OFDM. sequenceGroupHopping may disable sequence group hopping, and sequenceHopping may enable sequence hopping.

Figure 8:
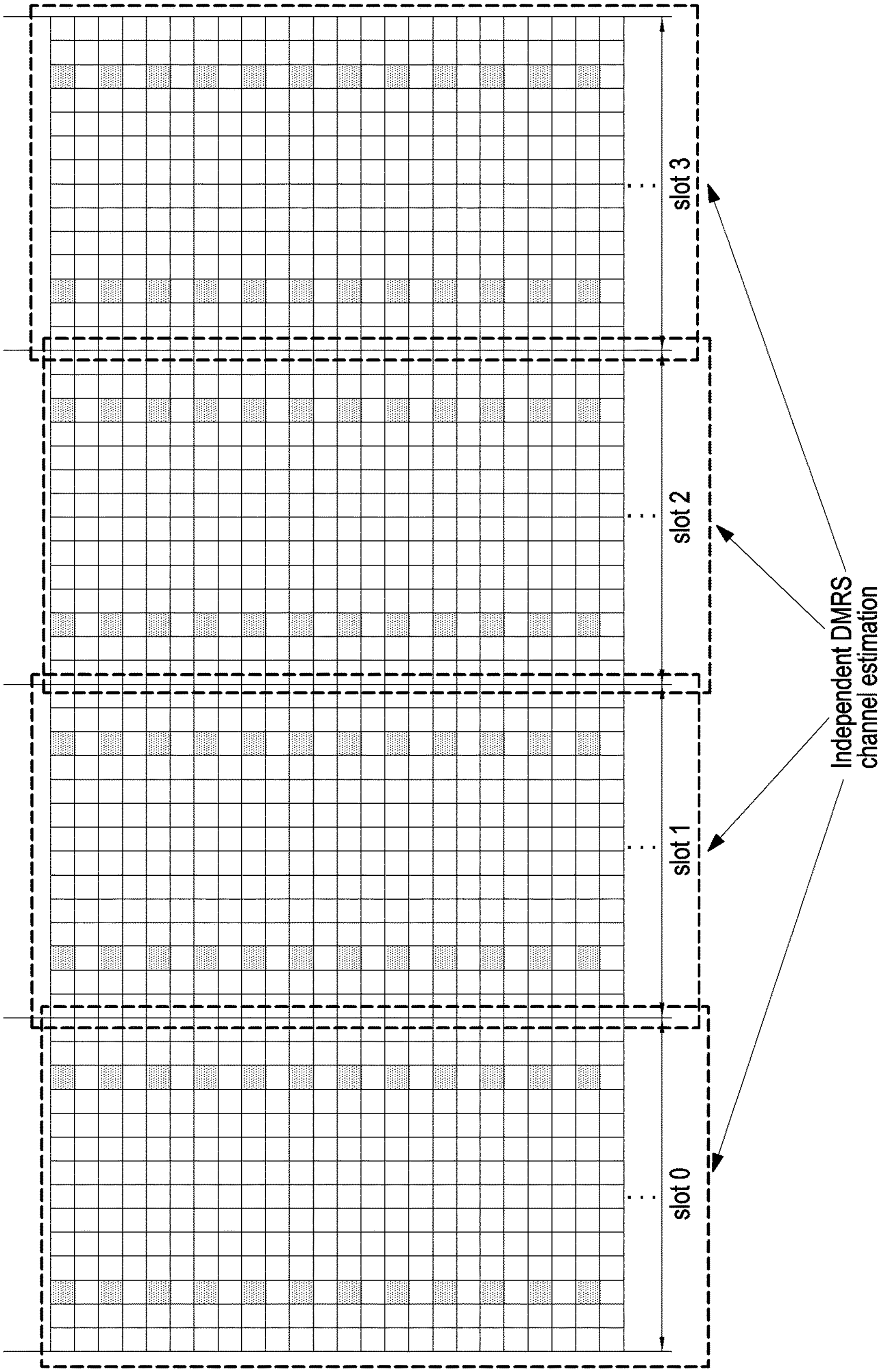
FIG. 8 is a view illustrating an example of channel estimation using a DMRS received in one PUSCH in a time domain of a 5G system.

FIG. 8 is a view illustrating an example of channel estimation using a DMRS received in one PUSCH in a time domain of a 5G system.

Referring to FIG. 8, in performing channel estimation for data decoding by DMRS, channel estimation may be performed within the precoding resource block group (PRG), which is a corresponding bundling unit, by the physical resource block (PRB) bundling linked to system band in the frequency band. Further, in a unit of time, channel estimation is performed under the assumption that precoding is the same for the DMRS received on only one PUSCH.

Figure 9:
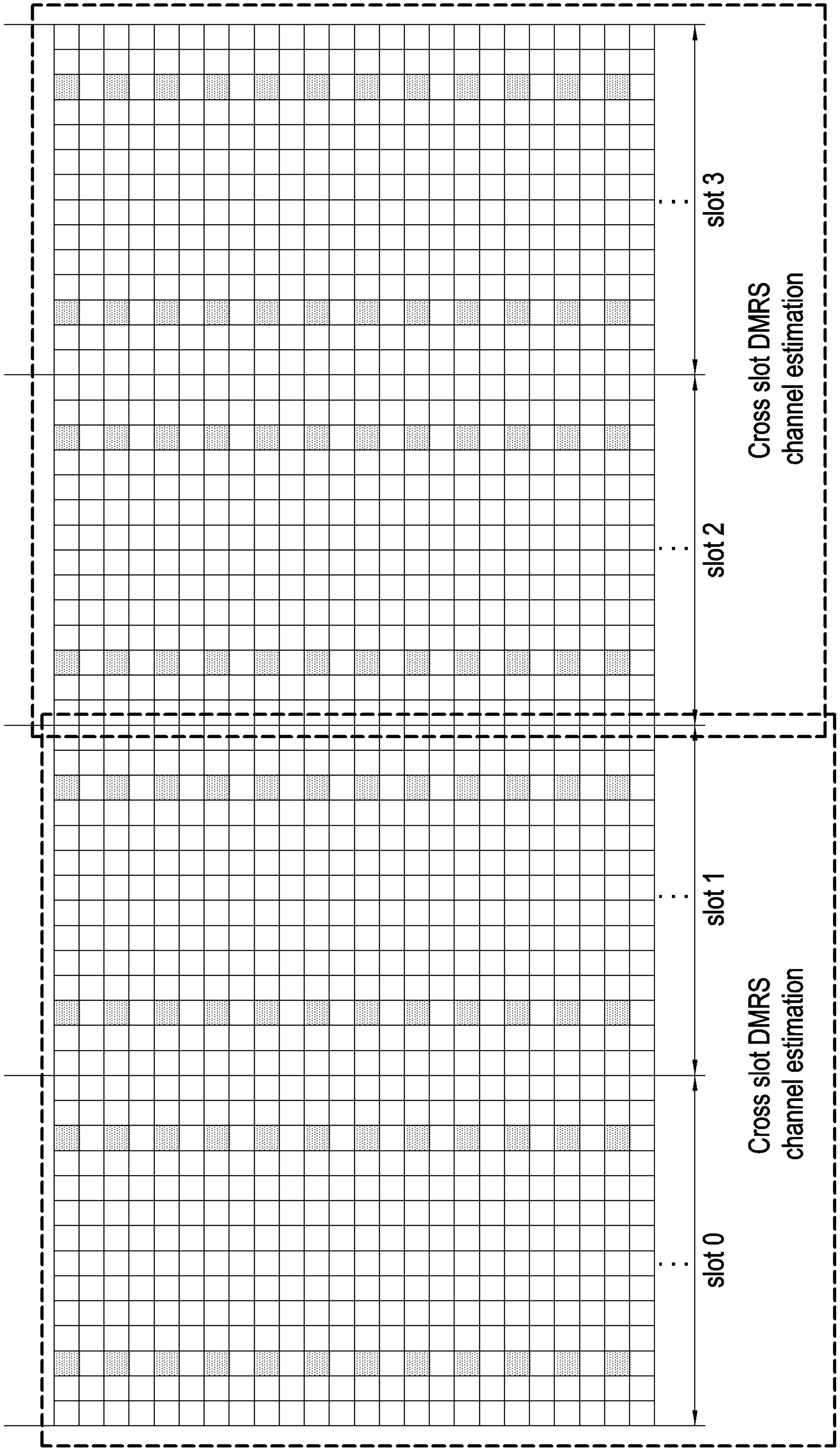
FIG. 9 is a view illustrating an example of simultaneous channel estimation using a DMRS received in a plurality of PUSCHs in a time domain of a 5G system.

FIG. 9 is a view illustrating an example of simultaneous channel estimation using a DMRS received in a plurality of PUSCHs in a time domain of a 5G system.

Referring to FIG. 9, the base station may indicate whether the UE uses the same precoding through configuration. Accordingly, the base station may estimate the channel by using DMRS transmissions using the same precoding together and may thus enhance DMRS channel estimation performance. To perform simultaneous channel estimation, power consistency and phase continuity may be maintained. To maintain the power consistency and phase continuity, the same transmission power and phase configuration, the same RB configuration, and the same MCS configuration are required, and DL transmission and reception and monitoring should not be performed between PUSCH/physical uplink control channel (PUCCH) where simultaneous channel estimation is performed. When the power consistency and phase continuity are maintained through the above configurations, simultaneous channel estimation using DMRS of multiple PUSCHs is possible.

Figure 10:
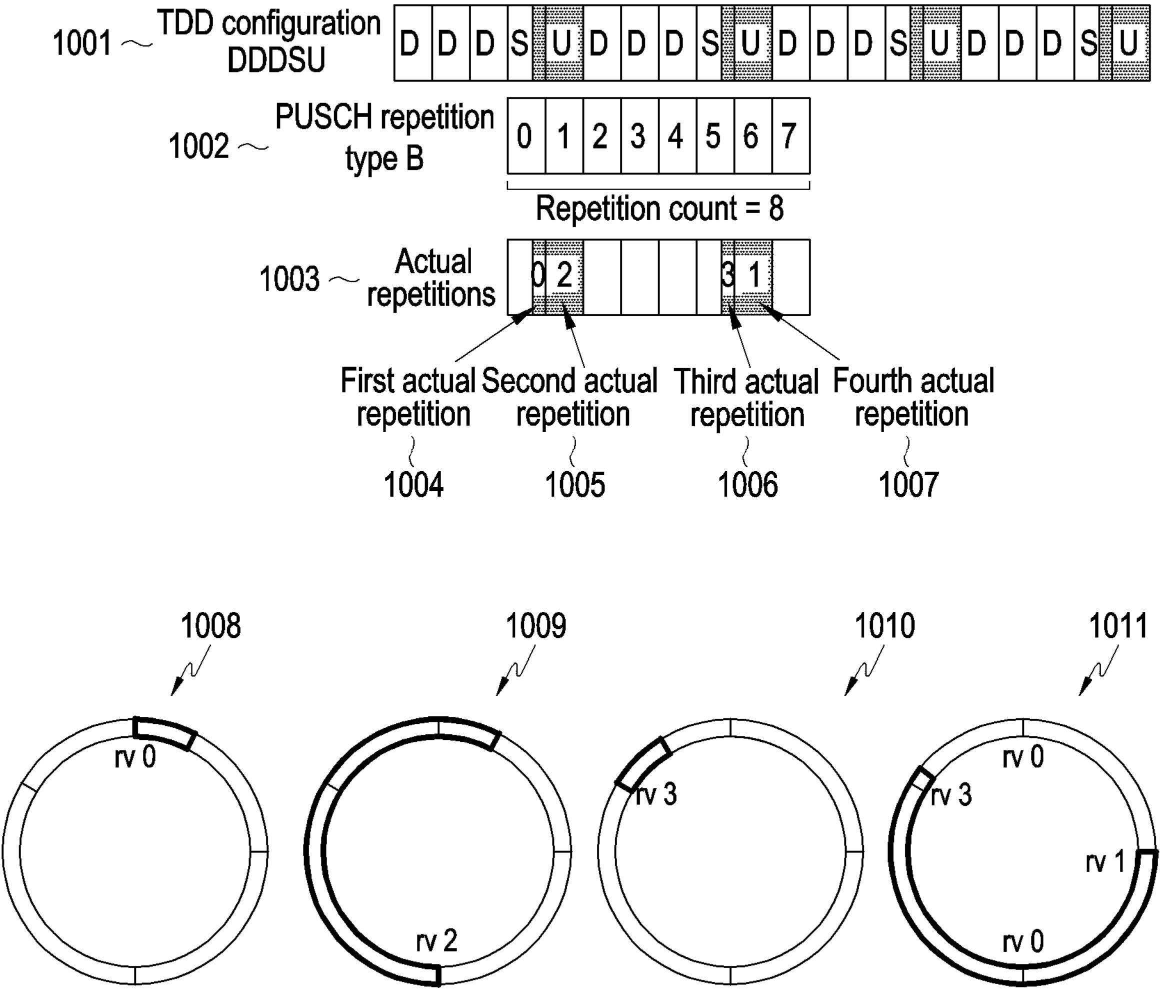
FIG. 10 is a view illustrating an example of PUSCH repetition type B in a 5G system.

Like in FIG. 8, even in FIG. 10, in performing channel estimation for data decoding by DMRS, channel estimation may be performed within the precoding resource block group (PRG), which is a corresponding bundling unit, by the physical resource block (PRB) bundling linked to system band in the frequency band. Further, in a unit of time, channel estimation is performed under the assumption that precoding is the same for the DMRS received on one or more PUSCHs. Thus, since channel estimation is possible based on several DMRSs in a time band, channel estimation performance may be enhanced. To enhance coverage, channel estimation performance may be very important because even when data decoding performance is good, channel estimation performance may become a bottleneck.

Hereinafter, time domain resource allocation (TDRA) for a data channel in a 5G communication system is described. The base station may configure the UE with a table for time domain resource allocation information for a physical downlink shared channel (PDSCH) and a physical uplink shared channel (PUSCH) via higher layer signaling (e.g., RRC signaling).

For PDSCH, the base station may configure a table including up to maxNrofDL-Allocations=16 entries and, for PUSCH, configure a table including up to maxNrofUL-Allocations=17 entries. The time domain resource allocation information may include at least one of, e.g., PDCCH-to-PDSCH slot timing (which is designated KO and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information for the position and length of the start symbol where the PDSCH or PUSCH is scheduled in the slot, and the mapping type of PDSCH or PUSCH.

In an embodiment, time domain resource allocation information for the PDSCH may be configured to the UE through RRC signaling as shown in Table 8 below.

TABLE 8

PDSCH-TimeDomainResourceAllocationList information element

```
PDSCH-TimeDomainResourceAllocationList ::=
SEQUENCE (SIZE(1..maxNrofDL-Allocations)) OF
PDSCH-TimeDomainResourceAllocation
PDSCH-TimeDomainResourceAllocation ::= SEQUENCE {
  k0                      INTEGER(0..32)   OPTIONAL, -- Need S
  mappingType             ENUMERATED {typeA, typeB},
  startSymbolAndLength    INTEGER (0..127)
  repetitionNumber        ENUMERATED {n2, n3, n4, n5, n6,
                          n7, n8, n16} OPTIONAL,
Cond Formats1-0and1-1
}
```

Here, k0 may indicate the PDCCH-to-PDSCH timing (i.e., the slot offset between the DCI and the scheduled PDSCH) in each unit of slot, mappingType may indicate the PDSCH mapping type, startSymbolAndLength may indicate the start symbol and length of the PDSCH, and repetitionNumber may indicate the number of PDSCH transmission occasions according to the slot-based repetition scheme.

In an embodiment, time domain resource allocation information for the PUSCH may be configured to the UE through RRC signaling as shown in Table 9 below.

TABLE 9

PUSCH-TimeDomainResourceAllocation information element

```
PUSCH-TimeDomainResourceAllocationList ::= SEQUENCE (SIZE(1..maxNrofUL-Allocations)) OF
PUSCH-TimeDomainResourceAllocation
PUSCH-TimeDomainResourceAllocation ::=      SEQUENCE {
  k2                                        INTEGER(0..32)              OPTIONAL, -- Need S
  mappingType                               ENUMERATED {typeA, typeB},
  startSymbolAndLength                      INTEGER (0..127)
}
PUSCH-Allocation-r16 ::= SEQUENCE {
  mappingType-r16                          ENUMERATED {typeA, typeB}          OPTIONAL, -- Cond
NotFormat01-02-Or-TypeA
  startSymbolAndLength-r16               INTEGER (0..127)        OPTIONAL,     -- Cond NotFormat01-02-Or-
TypeA
```

TABLE 9-continued

PUSCH-TimeDomainResourceAllocation information element

```
  startSymbol-r16                   INTEGER (0..13)         OPTIONAL,     -- Cond RepTypeB
  length-r16                        INTEGER (1..14)         OPTIONAL,     -- Cond RepTypeB
  numberOfRepetitions-r16           ENUMERATED {n1, n2, n3, n4, n7, n8, n12, n16} OPTIONAL, -- Cond
Format01-02
...
}
```

Here, k2 may indicate the PDCCH-to-PUSCH timing (i.e., the slot offset between the DCI and the scheduled PUSCH) in each unit of slot, mappingType may indicate the PUSCH mapping type, startSymbolAndLength or StartSymbol and length may indicate the start symbol and length of the PUSCH, and numberOfRepetitions may indicate the number of repetitions applied to PUSCH transmission.

The base station may indicate, to the UE, at least one of the entries in the table for the time domain resource allocation information through L1 signaling (e.g., downlink control information (DCI)) (which may be indicated with, e.g., the "time domain resource allocation" field in the DCI). The UE may obtain time domain resource allocation information for the PDSCH or PUSCH based on the DCI received from the base station.

Transmission of an uplink data channel (physical uplink shared channel (PUSCH)) in the 5G system is described below. PUSCH transmission may be dynamically scheduled by the UL grant in the DCI (e.g., referred to as dynamic grant (DG)-PUSCH), or may be scheduled by configured grant type 1 or configured grant type 2 (e.g., referred to as configured grant (CG)-PUSCH). Dynamic scheduling for PUSCH transmission may be indicated through, e.g., DCI format 0_0 or 0_1.

PUSCH transmission of configured grant type 1 may be semi-statically configured through reception of configuredGrantConfig including rrc-ConfiguredUplinkGrant of Table 10 through higher layer signaling without reception of the UL grant in the DCI. PUSCH transmission of configured grant type 2 may be semi-persistently scheduled by the UL grant in the DCI after receiving the configuredGrantConfig that does not include rrc-ConfiguredUplinkGrant of Table 10 through higher layer signaling.

In an embodiment, when PUSCH transmission is scheduled by the configured grant, parameters applied to PUSCH transmission may be configured through configuredGrantConfig which is the higher layer signaling of Table 10, except for specific parameters (e.g., dataScramblingIdentityPUSCH, txConfig, codebookSubset, maxRank, or scaling of UCI-OnPUSCH) provided through pusch-Config of Table 11 which is higher layer signaling. For example, if the UE receives transformPrecoder through configuredGrantConfig, which is higher layer signaling of Table 10, the UE may apply tp-pi2BPSK in push-Config of Table 11 for PUSCH transmission operated by the configured grant.

TABLE 10

ConfiguredGrantConfig

```
ConfiguredGrantConfig ::=           SEQUENCE {
  frequencyHopping                  ENUMERATED {intraSlot, interSlot}          OPTIONAL, -- Need S,
  cg-DMRS-Configuration             DMRS-UplinkConfig,
  mcs-Table                         ENUMERATED {qam256, qam64LowSE}            OPTIONAL, --
Need S
  mcs-TableTransformPrecoder        ENUMERATED {qam256, qam64LowSE}            OPTIONAL, --
Need S
  uci-OnPUSCH                       SetupRelease { CG-UCI-OnPUSCH }            OPTIONAL, -- Need M
  resourceAllocation                ENUMERATED { resourceAllocationType0, resourceAllocationType1,
 dynamicSwitch },
  rbg-Size                          ENUMERATED {config2}                       OPTIONAL, --
Need S
  powerControlLoopToUse             ENUMERATED {n0, n1},
  p0-PUSCH-Alpha                    P0-PUSCH-AlphaSetId,
  transformPrecoder                 ENUMERATED {enabled, disabled}             OPTIONAL, --
Need S
  nrofHARQ-Processes                INTEGER(1..17),
  repK                              ENUMERATED {n1, n2, n4, n8},
  repK-RV                           ENUMERATED (s1-0231, s2-0303, s3-0000}     OPTIONAL, --
Need R
  periodicity                       ENUMERATED {
  sym2, sym7, sym1x14, sym2x14, sym4x14, sym5x14, sym8x14, sym10x14, sym17x14, sym20x14,
  sym32x14, sym40x14, sym64x14, sym80x14, sym128x14, sym170x14, sym256x14, sym320x14,
sym512x14,
  sym640x14, sym1024x14, sym1280x14, sym2560x14, sym5120x14,
  sym6, sym1x12, sym2x12, sym4x12, sym5x12, sym8x12, sym10x12, sym17x12, sym20x12, sym32x12,
  sym40x12, sym64x12, sym80x12, sym128x12, sym170x12, sym256x12, sym320x12, sym512x12,
sym640x12,
  sym1280x12, sym2560x12
  },
  configuredGrantTimer              INTEGER (1..64)                            OPTIONAL, --
Need R
  rrc-ConfiguredUplinkGrant         SEQUENCE {
    timeDomainOffset                  INTEGER (0..5119),
```

TABLE 10-continued

```
ConfiguredGrantConfig

        timeDomainAllocation              INTEGER (0..16),
        frequencyDomainAllocation          BIT STRING (SIZE(18)),
        antennaPort                       INTEGER (0..31),
      dmrs-SeqInitialization                INTEGER (0..1)                  OPTIONAL, --
Need R
      precodingAndNumberOfLayers          INTEGER (0..63),
      srs-ResourceIndicator                 INTEGER (0..16)                 OPTIONAL, --
Need R
      mcsAndTBS                           INTEGER (0..31),
      frequencyHoppingOffset               INTEGER (1.. maxNrofPhysicalResourceBlocks−1)
OPTIONAL, -- Need R
      pathlossReferenceIndex              INTEGER (0..maxNrofPUSCH-PathlossReferenceRSs-
]),
      ...
   }                                                                        OPTIONAL, --
Need R
   ...
}
```

Next, PUSCH transmission is described. The DMRS antenna port for PUSCH transmission may be the same as the antenna port for SRS transmission. PUSCH transmission may follow codebook-based transmission and non-codebook-based transmission, respectively, depending on whether the value of txConfig in push-Config of Table 7, which is higher signaling, is 'codebook' or 'nonCodebook'. As described above, PUSCH transmission may be dynamically scheduled through DCI format 0_0 or 0_1 or be semi-statically configured by the configured grant.

If the UE is instructed to schedule PUSCH transmission through DCI format 0_0, the UE may perform beam configuration for PUSCH transmission using the pucch-spatialRelationInfoID corresponding to UE-specific (dedicated) PUCCH resource having the lowest ID in the activated uplink bandwidth part (BWP) in the serving cell. In an embodiment, PUSCH transmission may be performed based on a single antenna port. The UE may not expect scheduling for PUSCH transmission through DCI format 0_0 in a BWP in which PUCCH resource including pucch-spatialRelationInfo is not configured. If the UE has not had txConfig in push-Config of Table 11 configured thereto, the UE may not expect to be scheduled through DCI format 0_1.

TABLE 11

```
PUSCH-Config

PUSCH-Config ::=                     SEQUENCE {
   dataScramblingIdentityPUSCH       INTEGER (0..1023)              OPTIONAL, -- Need S
   txConfig                       ENUMERATED {codebook, nonCodebook}   OPTIONAL, -- Need S
   dmrs-UplinkForPUSCH-               SetupRelease                     OPTIONAL, -- Need M
   MappingTypeA                       { DMRS-UplinkConfig }
   dmrs-UplinkForPUSCH-               SetupRelease                     OPTIONAL, -- Need M
   MappingTypeB                       { DMRS-UplinkConfig }
   pusch-PowerControl                PUSCH-PowerControl               OPTIONAL, -- Need M
   frequencyHopping                  ENUMERATED                        OPTIONAL, -- Need S
                                     {intraSlot, interSlot}
   frequencyHoppingOffsetLists        SEQUENCE (SIZE (1..4))           OF INTEGER (1..
maxNrofPhysicalResourceBlocks−1)    OPTIONAL, -- Need M
   resourceAllocation               ENUMERATED { resourceAllocationType0, resourceAllocationType1,
dynamicSwitch},
   pusch-                         SetupRelease { PUSCH-TimeDomainResourceAllocationList }
   TimeDomainAllocationList
OPTIONAL, -- Need M
   pusch-AggregationFactor          ENUMERATED { n2, n4, n8 }          OPTIONAL, -- Need S
   mcs-Table                        ENUMERATED {qam256, qam64LowSE}    OPTIONAL, -- Need S
   mcs-TableTransformPrecoder       ENUMERATED {qam256, qam64LowSE}     OPTIONAL, -- Need S
   transformPrecoder                ENUMERATED {enabled, disabled}      OPTIONAL, -- Need S
   codebookSubset ENUMERATED {fullyAndPartialAndNonCoherent, partialAndNonCoherent,nonCoherent}
     OPTIONAL, -- Cond codebookBased
   maxRank                          INTEGER (1..4)                 OPTIONAL, -- Cond codebookBased
   rbg-Size                         ENUMERATED { config2}               OPTIONAL, -- Need S
   uci-OnPUSCH                      SetupRelease { UCI-OnPUSCH}         OPTIONAL, -- Need M
   tp-pi2BPSK                       ENUMERATED {enabled}                OPTIONAL, -- Need S
   ...
}
```

Next, codebook-based PUSCH transmission is described. Codebook-based PUSCH transmission may be dynamically operated through DCI format 0_0 or 0_1 or be semi-statically configured by the configured grant. if dynamically scheduled by codebook-based PUSCH DCI format 0_1 or semi-statically configured by configured grant, the UE may determine a precoder for PUSCH transmission based on the SRS resource indicator (SRI), transmission precoding matrix indicator (TPMI), and transmission rank (number of PUSCH transmission layers).

In an embodiment, the SRI may be given through a field SRS resource indicator in the DCI or configured through srs-ResourceIndicator which is higher signaling. The UE may have at least one SRS resource, e.g., up to two SRS resources, configured thereto upon codebook-based PUSCH transmission. When the UE receives the SRI through the DCI, the SRS resource indicated by the corresponding SRI may mean the SRS resource corresponding to the SRI among SRS resources transmitted prior to the PDCCH including the SRI. Further, the TPMI and transmission rank may be given through the field precoding information and number of layers in the DCI or configured through precodingAndNumberOfLayers, which is higher level signaling. The TPMI may be used to indicate the precoder applied to PUSCH transmission.

The precoder to be used for PUSCH transmission may be selected from an uplink codebook having the same number of antenna ports as the nrofSRS-Ports value in SRS-Config, which is higher signaling. In codebook-based PUSCH transmission, the UE may determine a codebook subset based on the TPMI and codebookSubset in push-Config, which is higher signaling. In an embodiment, codebookSubset in push-Config, which is higher signaling, may be configured to one of 'fully AndPartialAndNonCoherent', 'partialAndNonCoherent', or 'nonCoherent' based on the UE capability reported by the UE to the base station.

If the UE reports 'partialAndNonCoherent' as the UE capability, the UE may not expect the value of codebookSubset, which is higher signaling, to be configured to 'fully AndPartialAndNonCoherent'. Further, if the UE reports 'nonCoherent' as the UE capability, the UE may not expect the value of codebookSubset, which is higher signaling, to be configured to 'fully AndPartialAndNonCoherent' or 'partialAndNonCoherent'. If nrofSRS-Ports in SRS-ResourceSet, which is higher signaling, indicates two SRS antenna ports, the UE may not expect the value of codebookSubset, which is higher signaling, to be configured to 'partialAndNonCoherent'.

The UE may have one SRS resource set, in which the value of usage in SRS-ResourceSet, which is higher signaling, is configured to 'codebook,' configured thereto, and one SRS resource in the corresponding SRS resource set may be indicated through the SRI. If several SRS resources are configured in the SRS resource set in which the usage value in the SRS-ResourceSet, which is higher signaling, is configured to 'codebook', the UE may expect the same value to be configured for all SRS resources in the nrofSRS-Ports value in the SRS-Resource which is higher signaling.

The UE may transmit one or more SRS resources included in the SRS resource set in which the value of usage is configured to 'codebook' according to higher signaling to the base station, and the base station may select one of the SRS resources transmitted by the UE and instruct the UE to perform PUSCH transmission using transmission beam information about the corresponding SRS resource. In an embodiment, in codebook-based PUSCH transmission, the SRI is used as information for selecting an index of one SRS resource and may be included in the DCI. Additionally, the base station may include information indicating the TPMI and rank to be used by the UE for PUSCH transmission in the DCI and transmit it. The UE may perform PUSCH transmission by applying the precoder indicated by the rank and TPMI indicated by the transmission beam of the SRS resource using the SRS resource indicated by the SRI.

Next, non-codebook-based PUSCH transmission is described. Non-codebook-based PUSCH transmission may be dynamically operated through DCI format 0_0 or 0_1 or be semi-statically configured by the configured grant. When at least one SRS resource is configured in the SRS resource set in which the value of usage in the SRS-ResourceSet, which is higher signaling, is configured to 'nonCodebook', the UE may be scheduled for non-codebook based PUSCH transmission through DCI format 0_1.

For the SRS resource set in which the value of usage in the SRS-ResourceSet, which is higher signaling, is configured to 'nonCodebook', the UE may have a non-zero power (NZP) CSI-RS resource associated with one SRS resource set configured thereto. The UE may perform calculation on the precoder for SRS transmission through measurement of the NZP CSI-RS resource configured in association with the SRS resource set. If the difference between the last received symbol of the aperiodic NZP CSI-RS resource associated with the SRS resource set and the first symbol of aperiodic SRS transmission in the UE is smaller than specific symbols (e.g., 42 symbols), the UE may not expect that information about the precoder for SRS transmission is updated.

When the value of resourceType in SRS-ResourceSet, which is higher signaling, is configured to 'aperiodic', the NZP CSI-RS associated with the SRS-ResourceSet may be indicated by an SRS request, which is a field in DCI format 0_1 or 1_1. In an embodiment, if the NZP CSI-RS resource associated with the SRS-ResourceSet is an aperiodic NZP CSI resource and the value of the field SRS request in DCI format 0_1 or 1_1 is not '00', it may indicate that the NZP CSI-RS associated with the SRS-ResourceSet is present. The DCI may not indicate cross carrier or cross BWP scheduling. If the value of the SRS request indicates the presence of the NZP CSI-RS, the NZP CSI-RS may be positioned in the slot in which the PDCCH including the SRS request field is transmitted. TCI states configured in the scheduled subcarrier may not be configured to QCL-typeD.

If a periodic or semi-persistent SRS resource set is configured, the NZP CSI-RS associated with the SRS resource set may be indicated through associatedCSI-RS in the SRS-ResourceSet, which is higher signaling. For non-codebook-based transmission, the UE may not expect spatialRelationInfo, which is higher signaling for SRS resource, and associatedCSI-RS in SRS-ResourceSet, which is higher signaling, to be configured together.

When a plurality of SRS resources are configured to the UE, the UE may determine the precoder and transmission rank to be applied to PUSCH transmission based on the SRI indicated by the base station. In an embodiment, the SRI may be indicated through a field SRS resource indicator in the DCI or be configured through srs-ResourceIndicator which is higher signaling. Like the above-described codebook-based PUSCH transmission, when the UE receives the SRI through the DCI, the SRS resource indicated by the corresponding SRI may mean the SRS resource corresponding to the SRI among SRS resources transmitted prior to the PDCCH including the SRI. The UE may use one or more SRS resources for SRS transmission. The maximum number of SRS resources and the maximum number of SRS resources that may be simultaneously transmitted in the same symbol within one SRS resource set may be determined by the UE capability reported by the UE to the base station. The SRS resources transmitted simultaneously by the UE may occupy the same RB. The UE may configure one SRS port for each SRS resource. Only one SRS resource set in which the value of usage in the SRS-ResourceSet, which is higher signaling, is configured to 'nonCodebook' may be configured, and up to 4 SRS resources may be configured for non-codebook-based PUSCH transmission.

The base station may transmit one NZP CSI-RS associated with the SRS resource set to the UE, and the UE may calculate the precoder to be used for transmission of one or more SRS resources in the SRS resource set based on the measurement result upon NZP CSI-RS reception. The UE may apply the calculated precoder when transmitting one or more SRS resources in the SRS resource set with usage configured to 'nonCodebook' to the base station, and the base station may select one or more SRS resources among one or more SRS resources received. In non-codebook based PUSCH transmission, the SRI may indicate an index that may represent a combination of one or a plurality of SRS resources, and the SRI may be included in the DCI. The number of SRS resources indicated by the SRI transmitted by the base station may be the number of transmission layers of the PUSCH. The UE may apply the precoder applied to SRS resource transmission to each layer and transmit the PUSCH.

Single TB transmission through repeated transmission of an uplink data channel (PUSCH) and multiple slots in a 5G system is described below. The 5G system may support two types (e.g., PUSCH repetition type A and PUSCH repetition type B) of repeated transmission methods of uplink data channel (e.g., PUSCH) and TB processing over multi-slot PUSCH (TBoMS) that transmits a single TB over multi-slot PUSCH. Further, the UE may have either PUSCH repetition type A or B configured thereto by higher layer signaling. Further, the UE may have a numberOfSlotsTBoMS configured thereto through the resource allocation table and transmit the TBoMS.

PUSCH Repetition Type A

Through the time domain resource allocation in one slot, the start symbol and length of the uplink data channel may be transmitted, and the base station may transmit the number of repeated transmissions to the UE through higher layer signaling (e.g., RRC signaling) or L1 signaling (e.g., DCI). To determine the TBS, the number N of the slots configured to numberOfSlotsTBoMS may be 1.

The UE may repeatedly transmit uplink data channels, which are identical in start symbol and length to the configured uplink data channel, in consecutive slots based on the number of repeated transmissions received from the base station. In an embodiment, when at least one symbol in the slot for uplink data channel repeated transmission configured to the UE or the slot configured to the UE in the downlink by the base station is configured in the downlink, the UE may omit uplink data channel transmission in the corresponding slot. For example, the UE may not transmit uplink data channel within the number of repeated transmissions of uplink data channel. In contrast, the UE supporting Rel-17 uplink data repeated transmission may determine that the slots capable of uplink data repeated transmission are available slots, and count the number of transmissions upon uplink data channel repeated transmission for the slots determined to be an available slots. When the uplink data channel repeated transmission determined to be an available slot is omitted, it may be postponed, and then, be repeatedly transmitted through an available slot. By use of Table 12 below, a redundancy version may be applied according to the redundancy version pattern configured for each nth PUSCH transmission occasion.

PUSCH Repetition Type B

Through the time domain resource allocation in one slot, the start symbol and length of the uplink data channel may be transmitted, and the base station may transmit the number of repeated transmissions, numberofrepetitions, to the UE through higher layer signaling (e.g., RRC signaling) or L1 signaling (e.g., DCI). In an embodiment, to determine the TBS, the number N of the slots configured to numberOfSlotsTBoMS may be 1.

The nominal repetition of the uplink data channel may be determined as follows based on the start symbol and length of the uplink data channel configured above. Here, nominal repetition may mean the resources of the symbols configured by the base station for repeated PUSCH transmission. The UE may determine resources available for uplink in the configured nominal repetition. in this case, the slot where the nth nominal repetition starts may be given by $$K_s + \left\lfloor \frac{S + n \cdot L}{N_{symb}^{slot}} \right\rfloor,$$

and the symbol where the nominal repetition starts in the start slot may be given by $$\mathrm{mod}\left(S + n \cdot L,\ N_{symb}^{slot}\right).$$

The slot where the nth nominal repetition ends may be given by $$K_s + \left\lfloor \frac{S + (n+1) \cdot L - 1}{N_{symb}^{slot}} \right\rfloor,$$

and the symbol where the nominal repetition ends in the last slot may be given by $$\mathrm{mod}\left(S + (n+1) \cdot L - 1,\ N_{symb}^{slot}\right).$$

Here, n=0, . . . , numberofrepetitions−1, S may indicate the start symbol of the configured uplink data channel, and L may indicate the symbol length of the configured uplink data channel. $K_s$ may indicate the slot in which PUSCH transmission starts, and $$N_{symb}^{slot}$$

may indicate the number of symbols per slot.

The UE may determine an invalid symbol(s) for PUSCH repetition type B. The symbol configured as downlink by tdd-UL-DL-ConfigurationCommon or tdd-UL-DL-ConfigurationDedicated may be determined to be an invalid symbol for PUSCH repetition type B. Additionally, the invalid symbol(s) may be configured based on the higher layer parameter (e.g. InvalidSymbolPattern). As an example, as the higher layer parameter (e.g., InvalidSymbolPattern) provides a symbol level bitmap over one or two slots, an invalid symbol(s) may be configured. In an embodiment, in the bitmap, 1 may indicate an invalid symbol(s). Additionally, the higher layer parameter (e.g. periodicityAndPattern) may configure the periodicity and pattern of the bitmap. If the higher layer parameter (e.g. InvalidSymbolPattern) is configured, and InvalidSymbolPatternIndicator-ForDCIFormat0_1 or InvalidSymbolPatternIndicator-ForDCIFormat0_2 parameter indicates 1, the UE may apply the invalid symbol pattern and, if it indicates 0, may not apply the invalid symbol pattern. Or, if the higher layer parameter (e.g. InvalidSymbolPattern) is configured, and InvalidSymbolPatternIndicator-ForDCIFormat0_1 or InvalidSymbolPatternIndicator-ForDCIFormat0_2 parameter is not configured, the UE may apply the invalid symbol pattern.

After the invalid symbol is determined in each nominal repetition, the UE may consider symbols other than the determined invalid symbol as valid symbols. If each nominal repetition includes one or more valid symbols, the nominal repetition may include one or more actual repetitions. Here, each actual repetition may mean the symbol actually used for PUSCH repeated transmission among the symbols configured in the configured nominal repetition, and may include consecutive sets of valid symbols that may be used for PUSCH repeated transmission type B in one slot. when the actual repetition having one symbol is configured to valid except where the symbol length L of the configured uplink data channel is 1, the UE may omit the actual repetition transmission. By use of Table 8 below, a redundancy version may be applied according to the redundancy version pattern configured for each nth actual repetition.

FIG. 10 is a view illustrating an example of PUSCH repetition type B in a 5G system.

Referring to FIG. 10, the UE may receive a frame structure configuration 1001 of time division duplexing (TDD) through a DDDSU (e.g., 3 downlink slots, 1 special/flexible slot, and 1 uplink slot). Here, when the special/flexible slot is composed of, e.g., 11 downlink symbols and 3 uplink symbols, the initial transmission slot is the third in the second uplink transmission, and when the UE receives the index of the start symbol of the uplink data channel as 0, the symbol length of the uplink data channel as 14, and the number of repeated transmissions repK=8, the nominal repetition may appear in eight consecutive slots from the initial transmission slot (1002).

Thereafter, in each nominal repetition, the UE may determine that the symbol configured as a downlink symbol in the frame structure 1001 of the TDD system is an invalid symbol, and when valid symbols are configured as one or more consecutive symbols in one slot, the valid symbols may be configured and transmitted as an actual repetition 1003. Accordingly, the total repK_actual=4 PUSCHs may actually be transmitted.

In an embodiment, when the repK-RV is configured to 0-2-3-1, the redundancy version (RV) in the first PUSCH repetition 1004 actually transmitted may be 0, the RV in the second PUSCH repetition 1005 actually transmitted may be 2, the RV in the third PUSCH repetition 1006 actually transmitted may be 3, and the RV in the fourth PUSCH repetition 1007 actually transmitted may be 1. In an embodiment, only PUSCH repetitions having RV 0 and RV 3 may be self-decoded. In the case of the first PUSCH repetition 1004 and the third PUSCH repetition 1006, the PUSCH is transmitted only in three symbols less than the actually configured symbol length (e.g., 14 symbols), so that the bit length (e.g., bit length 1008 or bit length 1010) to be rate-matched to the PUSCH is less than the bit length (e.g., bit length 1009 or bit length 1011) calculated by the configuration.

TB Processing Over Multiple Slots (TBoMS)

As described above, through the time domain resource allocation in one slot, the start symbol and length of the uplink data channel may be transmitted, and the base station may transmit the number of repeated transmissions to the UE through higher layer signaling (e.g., RRC signaling) or L1 signaling (e.g., DCI). In an embodiment, the TBS may be determined using the number (e.g., N not less than 1) of slots configured by numberOfSlotsTBoMS.

The UE may transmit uplink data channels, which are identical in start symbol and length to the configured uplink data channel, in consecutive slots based on the number of repeated transmissions and the number of slots for determining the TBS, received from the base station. In an embodiment, when at least one symbol in the slot for uplink data channel repeated transmission configured to the UE or the slot configured to the UE in the downlink by the base station is configured in the downlink, the UE may omit uplink data channel transmission in the corresponding slot. For example, it may be included in the number of uplink data channel repeated transmissions, but may not be transmitted.

In contrast, the UE supporting Rel-17 uplink data repeated transmission may determine that the slot capable of uplink data repeated transmission is an available slot, and count the number of transmissions upon uplink data channel repeated transmission for the slot determined to be an available slot. When the uplink data channel repeated transmission determined to be an available slot is omitted, it may be postponed, and then, be repeatedly transmitted through an available slot. in an embodiment, by use of Table 12 below, a redundancy version may be applied according to the redundancy version pattern configured for each nth PUSCH transmission occasion.

TABLE 12

| $rv_{id}$ indicated by the DCI | $rv_{id}$ to be applied to $n^{th}$ transmission occasion (repetition Type A) or TB processing over multiple slots) or $n^{th}$ actual repetition (repetition Type B) | | | |
|---|---|---|---|---|
| scheduling the PUSCH | ((n − (n mod N))/N) mod 4 = 0 | ((n − (n mod N))/N) mod 4 = 0 | ((n − (n mod N))/N) mod 4 = 0 | ((n − (n mod N))/N) mod 4 = 0 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Determining an uplink available slot for single or multi-PUSCH transmission in a 5G system is described below.

In an embodiment, if AvailableSlotCounting is configured to enable in the UE, the UE may determine the available slot based on tdd-UL-DL-ConfigurationCommon, tdd-UL-DL- ConfigurationDedicated, ssb-PositionsInBurst and a time domain resource allocation (TDRA) information field value, for type A PUSCH repeated transmission and TBoMS PUSCH transmission. In other words, when at least one symbol configured with the TDRA for PUSCH in the slot for PUSCH transmission overlaps at least one symbol for other purposes than uplink transmission, the slot may be determined to be an unavailable slot.

In embodiments of the disclosure, when two TRPs having different PCIs are operated according to one serving cell configuration, the UE may determine reception of SSBs corresponding to the different PCIs and transmission/reception of another channel. In various embodiments, when two TRPs having different PCIs are operated according to one serving cell configuration in the wireless system, the UE may determine reception of SSBs corresponding to the different PCIs or transmission/reception of another channel.

Through embodiments of the disclosure, the UE may determine whether to receive SSBs corresponding to different PCIs and determine whether to transmit or receive another channel (e.g., at least one of PUSCH, TBoMS, PUCCH, PDSCH, or PDCCH) overlapping the received SSB, thereby supporting coverage enhancement and efficient resource management of the other channel.

Embodiments of the disclosure may determine reception of SSBs corresponding to different PCIs and transmission/reception of another channel when two TRPs having different PCIs are operated with one serving cell configuration. To determine reception of SSBs corresponding to different PCIs and transmission/reception of another channel (e.g., at least one of PUSCH, TBoMS, PUCCH, PDSCH, or PDCCH), at least one of method 1 to method 3 or a combination thereof may be used.

Method 1

In method 1, when two TRPs having different PCIs are operated based on one serving cell configuration, the UE may determine to receive only the SSB corresponding to the PCI allocated to the first TRP configured based on one ServCellIndex (e.g., ServCellIndex #1) and not to receive the other SSB. The UE may determine not to transmit or receive another channel (e.g., a physical channel) (e.g., a PUSCH, a PUCCH, a PDCCH, or a PDSCH) overlapping the SSB determined to be received.

Figure 11:
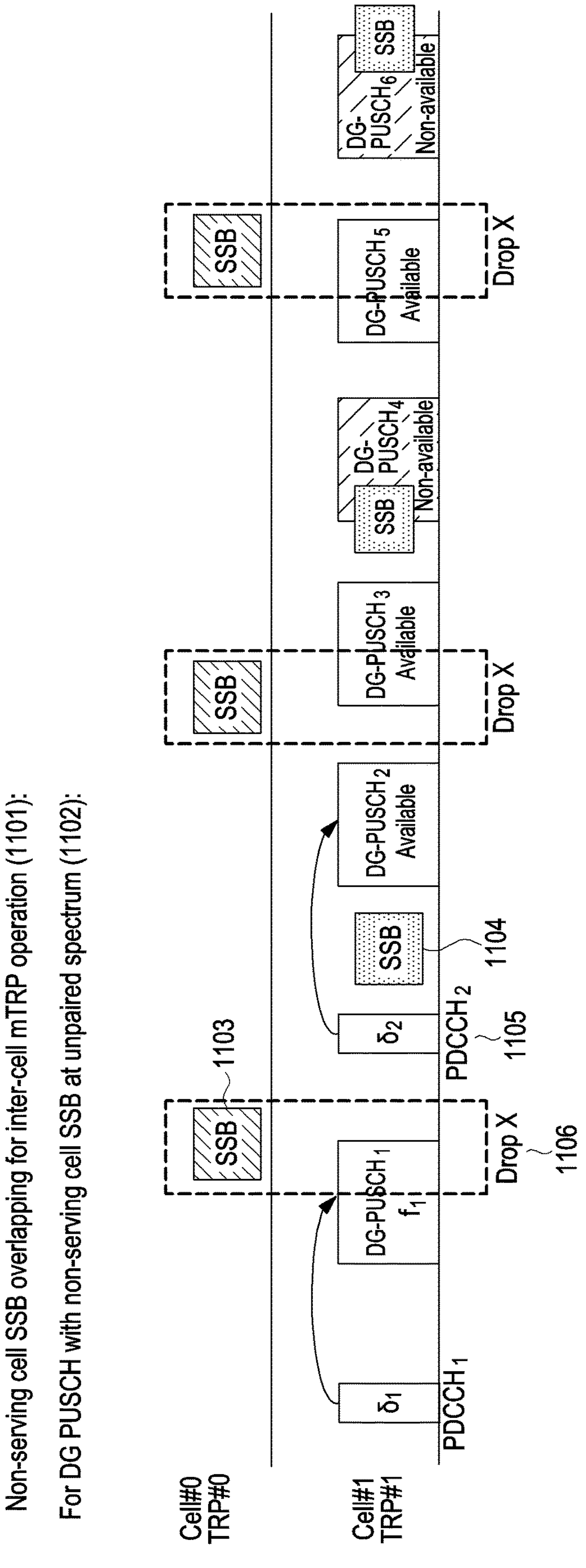
FIG. 11 is a view illustrating PUSCH transmission considering SSB reception of a TRP corresponding to a serving cell according to an embodiment.

FIG. 11 is a view illustrating PUSCH transmission considering SSB reception of a TRP corresponding to a serving cell when two TRPs having different PCIs are operated based on one serving cell configuration, according to an embodiment.

Referring to FIG. 11, a non-serving cell SSB overlapping 1101 for an inter-cell multiple TRP operation is illustrated. For example, there may be one or more dynamic grant (DG)-PUSCHs 1102 overlapping the non-serving cell SSB at an unpaired spectrum (e.g., a frequency channel of TDD). In an embodiment, DG-PUSCH$_1$ may be scheduled by PDCCH$_1$. In an embodiment, DG-PUSCH$_2$, DG-PUSCH$_3$, DG-PUSCH$_4$, DG-PUSCHs, and DG-PUSCH$_6$ may be scheduled by PDCCH$_2$. As an example, the DG-PUSCHs may be configured to be transmitted to TRP #1 through cell #1, which is a serving cell.

The UE may communicate with two TRPs (e.g., TRP #0, #1) having different PCIs based on one serving cell configuration. Based on the SSB configuration information of each of the different PCIs, the SSB 1103 and the SSB 1104 may be transmitted from TRP #0 (Cell #0) and TRP #1 (Cell #1) on different resources, respectively. The UE may receive and measure all of the SSBs 1103 and 1104 coming from the two TRPs, or may receive and measure at least one of the SSBs 1103 and 1104 according to the SMTC.

In an embodiment, when two TRPs having different PCIs are operated based on one serving cell configuration for the UE, the UE may receive SMTC through higher layer signaling, preferentially receive SSBs for a period (e.g., an SMTC window) configured by the SMTC, and may not transmit or receive another channel (e.g., DG-PUSCH) overlapping the SSBs. In an embodiment, when two TRPs having different PCIs are operated based on one serving cell configuration for the UE, the UE may receive SMTC through higher layer signaling, may receive only the SSB transmitted from the serving cell, and may not receive or ignore the SSB transmitted from the non-serving cell, outside the period configured by the SMTC.

In an embodiment, if the SSB transmitted with PCI configuration information different from the serving cell in Cell #0, which is the non-serving cell, overlaps another channel (e.g., PUSCH, TBoMS, or PUCCH), the UE may preferentially transmit the other channel. Here, the UE may not receive the overlapping SSB while transmitting the other channel. For example, when the SSB 1103 transmitted from TRP #0 in Cell #0, which is the non-serving cell, overlaps at least one dynamic grant (DG)-PUSCH (e.g., DG-PUSCH$_1$, DG-PUSCH$_3$, and DG-PUSCHs) of Cell #1, which is the serving cell, the UE may transmit the at least one DG-PUSCH (e.g., DG-PUSCH$_1$, DG-PUSCH$_3$, and DG-PUSCHs) without considering (i.e., without receiving) the SSB 1103 of the non-serving cell (1106).

In an embodiment, the UE may identify that the resource (e.g., the time domain) to which DG-PUSCH$_3$ or DG-PUSCHs is mapped overlaps the SSB 1103 of the non-serving cell, but may determine to transmit DG-PUSCH$_3$ or DG-PUSCH$_5$ through the same time resource without receiving the SSB of the non-serving cell. In an embodiment, upon identifying that the resource (e.g., the time domain) to which DG-PUSCH$_4$ or DG-PUSCH$_6$ is mapped overlaps the SSB 1104 of the serving cell, the UE may determine to receive the SSB 1104 through the same time resource without transmitting the DG-PUSCH$_4$ or DG-PUSCH$_6$.

In method 1, when two TRPs having different PCIs are operated based on one serving cell configuration, the UE may determine to transmit PUSCH (e.g., DG-PUSCH$_1$ to DG-PUSCH$_6$) considering reception of the SSB (e.g., SSB 1104) of the TRP (e.g., TRP #1) corresponding to the serving cell, but this operation is merely an example and embodiments of the disclosure may not be limited thereto.

In an embodiment, the UE may consider only the SSB of the serving cell to determine transmission or reception of Type A/B PUSCH repetition, TBoMS, Type 1/2 CG PUSCH, PUCCH, PDSCH with SIB1 or SI, Collision with SFI and CI, PRACH repetition transmission, PDSCH, PDCCH, or SRS. In an embodiment, in the case of uplink transmission (e.g., at least one of Type A/B PUSCH repeated transmission, TBoMS, configured grant (CG)-PUSCH, Msg3 PUSCH, or PUCCH), the UE may determine an available resource considering method 1 when determining a resource usable for the uplink transmission. In an embodiment, the uplink transmission may be determined by separately considering the SSB from the serving cell and the SSB from the non-serving cell. As an example, the UE may ignore the SSB transmitted from the non-serving cell and may determine whether to transmit a specific uplink channel (e.g., at least one of Type A/B PUSCH repeated transmission, TBoMS, configured grant (CG)-PUSCH, Msg3

PUSCH, or PUCCH) according to whether the SSB transmitted from the serving cell overlaps the mapped resource.

In an embodiment, even in the case of downlink transmission, the UE may monitor the PDSCH or PDCCH considering only the SSB configured for the serving cell. In an embodiment, if the PDSCH is scheduled by the PDCCH, the UE may determine whether the resource of the scheduled PDSCH overlaps the SSB configured for the serving cell, and when overlapping the SSB transmitted through the serving cell, the UE may determine that the PDSCH is not transmitted from the base station. In an embodiment, when the resource of the scheduled PDSCH overlaps the SSB configured for the non-serving cell, the UE may monitor reception of the PDSCH without receiving the SSB of the non-serving cell.

In method 1, the UE may consider only the SSB of the serving cell in determining the resource capable of downlink reception and monitoring. Accordingly, the UE may obtain a higher data rate and coverage by transmitting and receiving data and control information for more resources.

In an embodiment, upon identifying that the resource (e.g., time domain) to which the downlink channel (e.g., the PDSCH) is mapped overlaps the SSB (e.g., the SSB 1103) of the non-serving cell, the UE may determine to receive the PDSCH through the same time resource without receiving the SSB of the non-serving cell. In an embodiment, upon identifying that the resource (e.g., the time domain) to which the PDSCH is mapped overlaps the SSB (e.g., the SSB 1104) of the serving cell, the UE may determine not to receive the PDSCH but to receive the SSB 1104 through the same time resource.

Method 2

In method 2, when two TRPs having different PCIs are operated based on one serving cell configuration, the UE may determine transmission/reception (e.g., PUSCH transmission) of another channel by considering all SSBs having different PCIs through the two TRPs.

Figure 12:
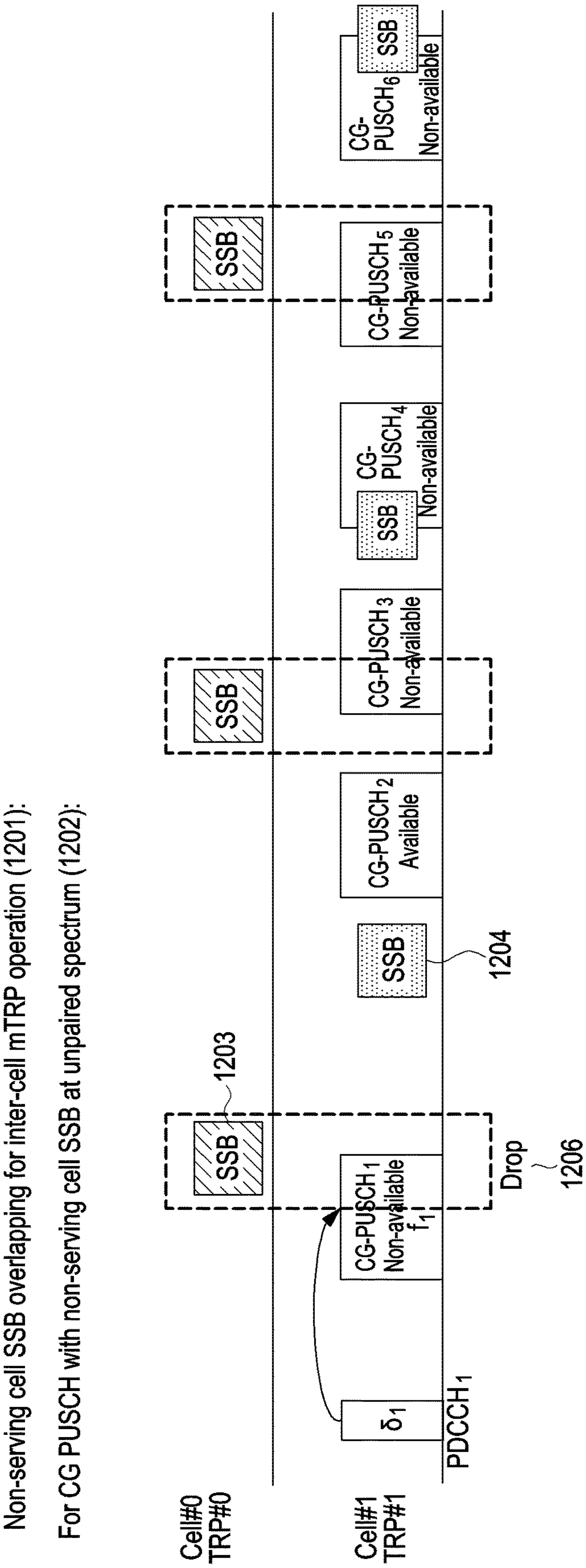
FIG. 12 is a view illustrating PUSCH transmission considering SSBs configured with different PCIs corresponding to a serving cell and a non-serving cell according to an embodiment.

FIG. 12 illustrates PUSCH transmission considering SSBs configured with different PCIs corresponding to a serving cell and a non-serving cell when two TRPs having different PCIs are operated based on one serving cell configuration, according to an embodiment.

Referring to FIG. 12, a non-serving cell SSB overlapping 1201 for an inter-cell multiple TRP operation is illustrated. For example, there may be one or more configured grant (CG)-PUSCHs 1202 overlapping the non-serving cell SSB at an unpaired spectrum (e.g., a frequency channel of TDD). In an embodiment, DG-$PUSCH_1$ may be scheduled by $PDCCH_1$. In an embodiment, CG-$PUSCH_2$, CG-$PUSCH_3$, CG-$PUSCH_4$, CG-PUSCHs, and CG-$PUSCH_6$ may be configured by higher layer signaling (e.g., configured grant type 1 or 2). As an example, the CG-PUSCHs may be configured to be transmitted to TRP #1 through cell #1, which is a serving cell.

The UE may communicate with two TRPs (e.g., TRP #0 and TRP #1) having different PCIs based on one serving cell configuration. The UE may be configured with the SSB 1204 for Cell #1, which is the serving cell, and the SSB 1203 for Cell #0, which is the non-serving cell, from the two TRPs having different PCIs. In an embodiment, the UE may always receive and measure SSBs transmitted from the cells (e.g., Cell #0 and Cell #1) in preference to other channels, regardless of SMTC through higher layer signaling.

In an embodiment, when the SSB 1203 configured for Cell #0, which is the non-serving cell, overlaps another channel (e.g., DG-$PUSCH_1$ of Cell #1, which is the serving cell) at the same time, the UE may determine to receive the SSB 1203 without transmitting the DG-$PUSCH_1$ (1206). In an embodiment, upon identifying that the resource to which CG-$PUSCH_3$ or CG-PUSCHs of Cell #1, which is the serving cell, is mapped overlaps the SSB 1203 of Cell #0, which is the non-serving cell, the UE may determine to receive the SSB 1204 without transmitting the CG-$PUSCH_3$ or CG-PUSCHs. In an embodiment, upon identifying that the resource to which the CG-$PUSCH_4$ or CG-$PUSCH_6$ of Cell #1, which is the serving cell, is mapped overlaps the SSB 1204 of Cell #1, which is the serving cell, the UE may determine to receive the SSB 1204 without transmitting the CG-$PUSCH_4$ or CG-$PUSCH_6$.

In method 2, when two TRPs having different PCIs are operated based on one serving cell configuration, the UE may determine to transmit PUSCH considering all of the SSBs configured with different PCIs respectively corresponding to the serving cell and the non-serving cell, but this operation is merely an example and embodiments of the disclosure may not be limited thereto.

In an embodiment, the UE may consider both the SSBs of the serving cell and the non-serving cell to determine transmission or reception of Type A/B PUSCH repetition, TBoMS, Type 1/2 CG PUSCH, PUCCH, PDSCH with SIB1 or SI, Collision with SFI and CI, PRACH repetition transmission, PDSCH, PDCCH, or SRS.

In an embodiment, in the case of uplink transmission (e.g., at least one of Type A/B PUSCH repeated transmission, TBoMS, CG-PUSCH, Msg3 PUSCH, or PUCCH), the UE may determine an available resource considering method 2 when determining a resource usable for the uplink transmission. In an embodiment, the uplink transmission may be determined by considering both the SSB from the serving cell and the SSB from the non-serving cell. As an example, the UE may determine whether to transmit a specific uplink channel (e.g., at least one of Type A/B PUSCH repeated transmission, TBoMS, configured grant (CG)-PUSCH, Msg3 PUSCH, or PUCCH) depending on whether the specific channel overlaps the SSB of the serving cell or the SSB of the non-serving cell.

In an embodiment, in the case of downlink transmission, the UE may monitor the PDSCH or PDCCH considering both the SSB transmitted through the serving cell and the SSB transmitted through the non-serving cell. In an embodiment, if the PDSCH is scheduled by the PDCCH, the UE may determine whether the scheduled PDSCH resource overlaps the SSB configured for the serving cell or the SSB configured for the non-serving cell and, when overlapping any one SSB, may determine that the PDSCH is not transmitted from the base station. The UE may determine to receive the SSB from the serving cell or the non-serving cell in the overlapping resources.

In Method 2, the UE may frequently measure and report the channel state for each serving cell and non-serving cell, and the base station may more efficiently manage synchronization reconfiguration and handover.

Method 3

In method 3, when two TRPs having different PCIs are operated based on one serving cell configuration, the UE may determine transmission of another channel (e.g., PUSCH) considering an overlap between SSBs transmitted in the serving cell and the non-serving cell and the other channel.

Figure 13:
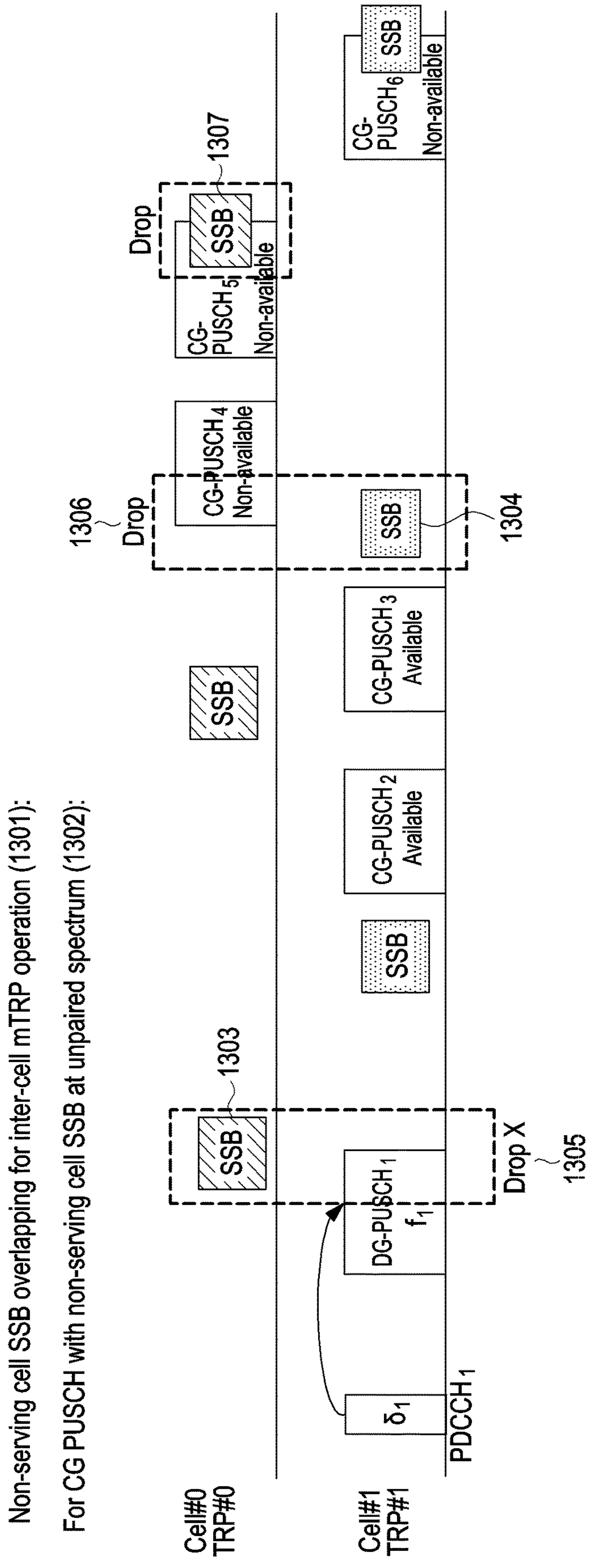
FIG. 13 is a view illustrating PUSCH transmission considering overlap between SSB and PUSCH per cell according to an embodiment.

FIG. 13 is a view illustrating PUSCH transmission considering cell specific SSB and PUSCH overlap when two TRPs having different PCIs are operated based on one serving cell configuration, according to an embodiment.

Referring to FIG. 13, a non-serving cell SSB overlapping 1301 for an inter-cell multiple TRP operation is illustrated. For example, there may be one or more CG-PUSCHs 1302 overlapping the non-serving cell SSB at an unpaired spectrum (e.g., a frequency channel of TDD). In an embodiment, DG-PUSCH$_1$ may be scheduled by PDCCH$_1$. In an embodiment, CG-PUSCH$_2$, CG-PUSCH$_3$, CG-PUSCH$_4$, CG-PUSCHs, and CG-PUSCH$_6$ may be configured by higher layer signaling (e.g., configured grant type 1 or 2). As an example, CG-PUSCH$_2$, CG-PUSCH$_3$, and CG-PUSCH$_6$ may be configured to be transmitted to TRP #1 through cell #1, which is the serving cell. As an example, CG-PUSCH$_4$ and CG-PUSCHs may be configured to be transmitted to TRP #0 through cell #0 which is the non-serving cell.

The UE may communicate with two TRPs (e.g., TRP #0 and TRP #1) having different PCIs based on one serving cell configuration. The UE may be configured to receive the SSB 1303 and the SSB 1304 from TRP #0 (Cell #0) and TRP #1 (Cell #1) through different resources based on two pieces of SSB configuration information corresponding to different PCIs. For the SSBs 1303 and 1304 configured from the two TRPs, the UE may receive and measure all the SSBs coming from the two TRPs according to the SMTC.

In an embodiment, when two TRPs having different PCIs are operated based on one serving cell configuration for the UE, the UE may receive the SMTC through higher layer signaling, may receive the SSBs (e.g., the SSBs 1303 and 1304) in preference to another channel during the SMTC period configured by the SMTC, and may not transmit or receive another channel overlapping the SSBs. In an embodiment, when two TRPs having different PCIs are operated based on one serving cell configuration for the UE, the UE may receive the SMTC through higher layer signaling, and may consider reception of the SSB and transmission and reception of another channel considering the other channel and SSBs overlapping each other, outside the SMTC period configured by the SMTC.

In an embodiment, when the SSB 1307 transmitted from TRP #0 in Cell #0, which is the non-serving cell, overlaps the CG-PUSCHs configured to be transmitted from TRP #0 in Cell #0, which is the non-serving cell, the UE may determine to receive the SSB 1307 and may determine not to transmit (i.e., determine to drop) the CG-PUSCH$_5$. In an embodiment, when the DG-PUSCH$_1$ configured to be transmitted through the serving cell Cell #1 and the SSB 1303 of Cell #0 overlap each other, the UE may determine to transmit the DG-PUSCH$_1$ transmitted from the serving cell Cell #1 without receiving the SSB 1303 (1305). In an embodiment, the UE may preferentially receive the SSB (e.g., the SSB 1304) transmitted from cell #1 which is the serving cell, and may determine not to transmit (i.e., determine to drop) the other channels (e.g., the CG-PUSCH$_4$) overlapping the SSB 1304 and configured to be transmitted/received through cell #0 which is the non-serving cell. (1306)

In method 3, when two TRPs having different PCIs are operated based on one serving cell configuration, the UE may determine to transmit the PUSCH considering an overlap with the SSB transmitted through the non-serving cell and SSB reception of the TRP corresponding to the serving cell, but this operation is merely an example and embodiments of the disclosure may not be limited thereto.

For example, the UE may consider the SSB corresponding to each channel to determine transmission or reception of another channel (Type A/B PUSCH repetition, TBoMS, Type 1/2 CG PUSCH, PUCCH, PDSCH with SIB1 or SI, Collision with SFI and CI, PRACH repetition transmission, PDSCH, PDCCH, or SRS).

In an embodiment, in the case of uplink transmission (e.g., at least one of Type A/B PUSCH repeated transmission, TBoMS, CG-PUSCH, Msg3 PUSCH, or PUCCH), the UE may determine an available resource considering method 3 when determining a resource usable for the uplink transmission. In an embodiment, the uplink transmission may be determined by considering corresponding one of the SSB from the serving cell and the SSB from the non-serving cell. In an embodiment, transmission of PUSCH may be determined for each cell (cell specifically), considering the SSB of the corresponding cell.

In an embodiment, in the case of downlink transmission, the UE may monitor the PDSCH or PDCCH of the serving cell, considering the SSB configured as the serving cell. In other words, in determining resources capable of downlink reception and monitoring, the UE always receives the SSB of the serving cell and may consider the SSB of the non-serving cell for each cell (cell specifically).

In an embodiment, if the PDSCH is scheduled by the PDCCH, the UE may determine whether the scheduled PDSCH resource overlaps the SSB configured for the serving cell or the SSB configured for the non-serving cell and, when overlapping any one SSB, may determine that the PDSCH is not transmitted from the base station. The UE may determine to receive the SSB from the serving cell or the non-serving cell in the overlapping resources.

In method 3, the UE may better manage the resources of the serving cell, and may obtain a high data rate by maximizing PUSCH transmission in the non-serving cell.

Through method 1 to method 3, when the UE operates two TRPs having different PCIs based on one serving cell configuration, PUSCH transmission/reception according to overlap of the SSB and another channel may be provided. One or a combination of the above methods may be applied depending on the channel overlapping the SSB.

In an embodiment, in the case of CG-PUSCH, the UE may preferentially receive and measure SSB (e.g., SSB of the serving cell and SSB of the non-serving cell) according to method 2. In the case of the DG-PUSCH, the UE may determine whether to transmit the DG-PUSCH by considering only the SSB from the serving cell through method 1. For example, when the SSB of the serving cell overlaps the DG-PUSCH, the UE may drop transmission of the DG-PUSCH and receive the SSB.

Whether the SSB is received may have a great influence on the power management aspect of the UE and the base station. Since SSB is repeatedly transmitted and received for cell operation, the methods may be considered in operation of a single TRP, operation of two or more multiple TRPs, and a CA situation in order to reduce the priority of SSB reception and to save power and energy of the UE and the base station. In an embodiment, the methods are not limited to SSB (i.e., SS/PBCH), and at least one of the methods may be applied to CSI-RS and SRS, which are other reference signals.

Figure 14:
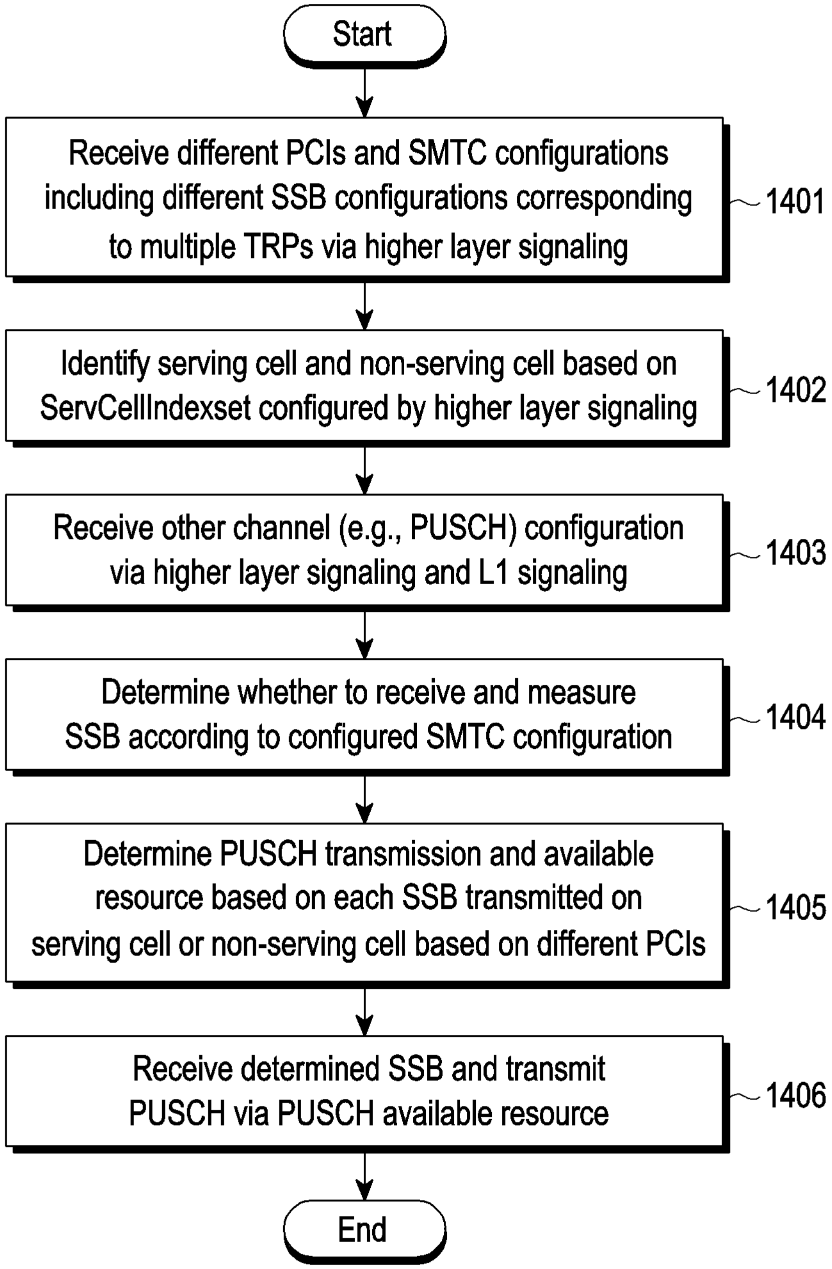
FIG. 14 is a flowchart of a UE determining whether to transmit/receive an SSB and other channels according to an embodiment.

FIG. 14 is a flowchart of a UE for determining transmission/reception of SSBs transmitted through a serving cell and a non-serving cell and another channel according to an embodiment. In various embodiments, at least one of the operations described below may be omitted, modified, or changed in order.

Referring to FIG. 14, in operation 1401, the UE may receive, from the base station, information related to different SSB configurations, e.g., PCI information including different SSB configurations corresponding to multiple TRPs having different PCIs, and SMTC configuration information for frequency resource management via higher layer signaling. In operation 1402, the UE may identify the serving cell and the non-serving cell based on the ServCellIndex value configured by the higher layer signaling. In an embodiment, the information about the configurability of the different PCIs including the different SSB configurations may be reported to the base station through the capability (e.g., UEcapability) of the UE. In operation 1403, the UE may be configured with another channel (e.g., a physical channel) (e.g., at least one of PUSCH, PUCCH, TBoMS, PDSCH, or PDCCH) from the base station via higher layer signaling and L1 signaling.

In operation 1404, the UE may determine whether to receive the SSB according to the SMTC configuration. For example, the UE may determine whether to receive the SSB for each transmission time unit (e.g., a slot or at least one symbol). For example, the UE may determine to unconditionally receive the SSB within the SMTC window (e.g., transmission time units included in the SMTC window) configured by the SMTC. In an embodiment, the UE may determine to drop another channel overlapping the SSB in the SMTC window. In various embodiments, the UE may determine whether to perform reception and measurement of the SSB according to one or a combination thereof, outside the SMTC window.

In operation 1405, after determining SSB reception and measurement according to SMTC configuration, the UE may determine resources available for transmission or reception of another channel (e.g., an uplink channel or a downlink channel overlapping the SSB determined to be received by the UE) according to one of the above methods or a combination thereof. In operation 1406, according to the determination, the UE may receive the SSB and/or may transmit, receive, or drop another channel.

In an embodiment, the UE may omit transmission of the uplink channel determined to be dropped. In an embodiment, the UE may not receive the downlink channel determined to be dropped.

Figure 15:
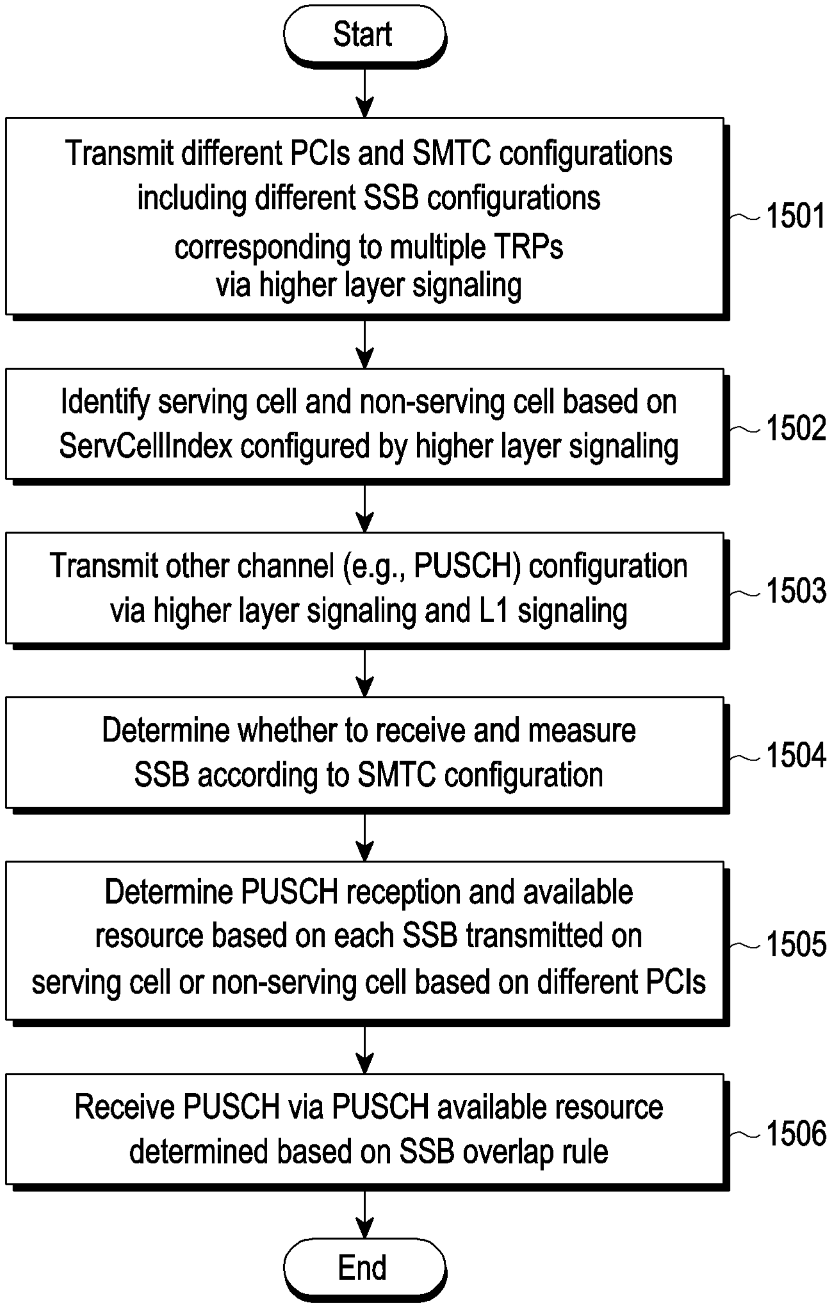
FIG. 15 is a flowchart of a base station determining whether to transmit/receive an SSB and other channels according to an embodiment.

FIG. 15 is a flowchart of a base station for determining transmission/reception of channels different from SSBs transmitted through a serving cell and a non-serving cell, according to an embodiment. In various embodiments, at least one of the operations described below may be omitted, modified, or changed in order.

Referring to FIG. 15, in operation 1501, the base station may transmit, to the UE, information related to different SSB configurations, e.g., PCI information including different SSB configurations corresponding to multiple TRPs having different PCIs, and SMTC configuration information for frequency resource management via higher layer signaling. In operation 1502, the base station may determine the serving cell and the non-serving cell for the UE based on the ServCellIndex value configured by the higher layer signaling. In an embodiment, the information about the configurability of the different PCIs including the different SSB configurations may be received from the UE through the capability (e.g., UEcapability) of the UE, and the base station may configure different SSBs considering the capability of the UE. In operation 1503, the base station may configure, to the UE, another channel (e.g., at least one of PUSCH, PUCCH, TBoMS, PDSCH, or PDCCH) from the base station via higher layer signaling and L1 signaling.

In operation 1504, the base station may determine the priority of the SSB according to the SMTC configuration. For example, the base station may determine whether the UE receives the SSB for each transmission time unit (e.g., a slot or at least one symbol). For example, the base station may determine that the UE unconditionally receives the SSB within the SMTC window (e.g., transmission time units included in the SMTC window) configured by the SMTC. In an embodiment, the base station may determine that another channel overlapping the SSB in the SMTC window is dropped by the UE. In an embodiment, the base station may predict that the UE is to determine whether to perform reception and measurement of the SSB according to one or a combination thereof, outside the SMTC window.

In operation 1505, after determining SSB reception and measurement of the UE according to SMTC configuration, the base station may determine resources available for transmission or reception of another channel (e.g., an uplink channel or a downlink channel overlapping the SSB predicted to be received by the UE) according to one of the above methods or a combination thereof. In operation 1506, the base station may transmit SSBs through TRPs and may also transmit, receive, or drop the other channel according to the determination.

In an embodiment, the base station may not receive the uplink channel determined to be dropped by the UE. In an embodiment, the base station may omit transmission of the downlink channel that the UE has determined not to receive according to any of the methods.

Figure 16:
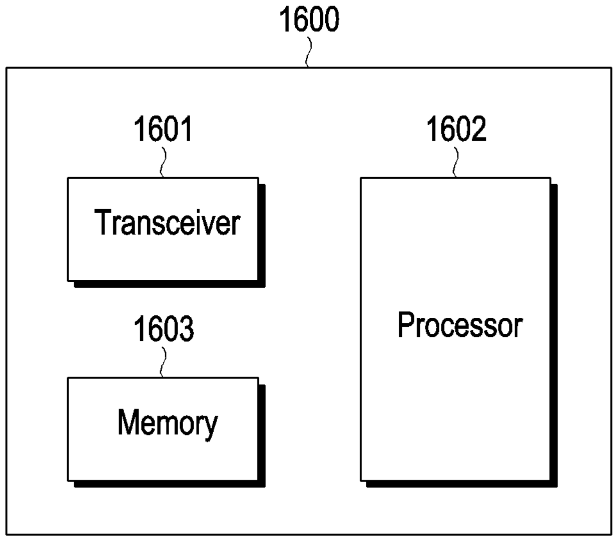
FIG. 16 is a block diagram illustrating a UE according to an embodiment of the disclosure.

FIG. 16 is a block diagram illustrating a UE according to an embodiment of the disclosure.

Referring to FIG. 16, a UE 1600 may include a transceiver 1601, a controller (e.g., processor) 1602, and a storage unit (e.g., memory) 1603. The transceiver 1601, controller 1602, and storage unit 1603 of the UE 1600 may be operated according to at least one or a combination of the methods corresponding to the above-described embodiments. However, the components of the UE 1600 are not limited to the shown examples. According to an embodiment, the UE 1600 may include more or fewer components than the above-described components. According to an embodiment, the transceiver 1601, the controller 1602, and the storage unit 1603 may be implemented in the form of a single chip.

According to an embodiment, the transceiver 1601 may include a transmitter and a receiver. The transceiver 1601 may transmit and receive signals to/from a base station. The signals may include control information and data. The transceiver 1601 may include an RF transmitter for frequency-up converting and amplifying signals transmitted and an RF receiver for low-noise amplifying signals received and frequency-down converting the frequency of the received signals. The transceiver 1601 may receive signals via a radio channel, output the signals to the controller 1602, and transmit signals output from the controller 1602 via a radio channel.

The controller 1602 may control a series of procedures to allow the UE 1600 to operate as per the above-described embodiments. For example, the controller 1602 may perform or control the operations of the UE to perform at least one or a combination of the methods according to embodiments of the disclosure. The controller 1602 may include at least one processor. For example, the controller 1602 may include a communication processor (CP) that performs control for communication and an application processor (AP) that controls an upper layer, such as an application program.

The storage unit 1603 may store control information (e.g., information related to channel estimation using DMRSs transmitted in the PUSCH included in the signal obtained by the UE 1600) or data, and may have an area for storing data necessary for control by the controller 1602 and data generated when controlled by the controller 1602.

Figure 17:
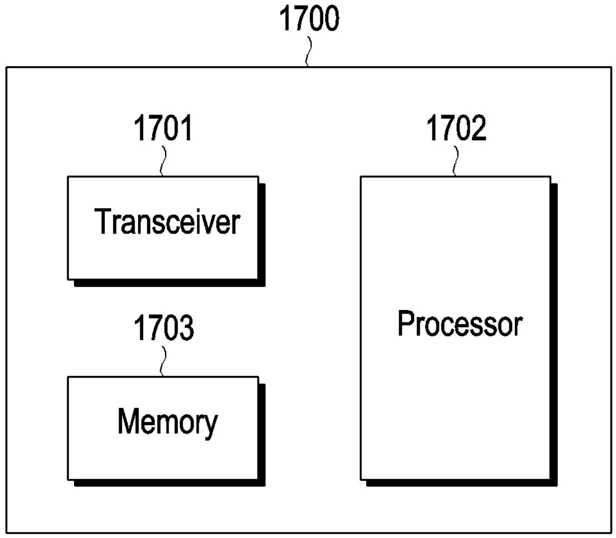
FIG. 17 is a block diagram illustrating a base station according to an embodiment of the disclosure.

FIG. 17 is a block diagram illustrating a base station according to an embodiment.

Referring to FIG. 17, a base station 1700 may include a transceiver 1701, a controller (e.g., processor) 1702, and a storage unit (e.g., memory) 1703. The transceiver 1701, controller 1702, and storage unit 1703 of the base station 1700 may be operated according to at least one or a combination of the methods corresponding to the above-described embodiments. However, the components of the base station 1700 are not limited to the shown examples. According to an embodiment, the base station 1700 may include more or fewer components than the above-described components. According to an embodiment, the transceiver 1701, the controller 1702, and the storage unit 1703 may be implemented in the form of a single chip.

According to an embodiment, the transceiver 1701 may include a transmitter and a receiver. The transceiver 1701 may transmit and receive signals to/from a UE. The signals may include control information and data. The transceiver 1701 may include an RF transmitter for frequency-up converting and amplifying signals transmitted and an RF receiver for low-noise amplifying signals received and frequency-down converting the frequency of the received signals. The transceiver 1701 may receive signals via a radio channel, output the signals to the controller 1702, and transmit signals output from the controller 1702 via a radio channel.

The controller 1702 may control a series of procedures to allow the base station 1700 to operate as per the above-described embodiments. For example, the controller 1702 may perform or control the operations of the base station to perform at least one or a combination of the methods according to embodiments of the disclosure. The controller 1702 may include at least one processor. For example, the controller 1702 may include a communication processor (CP) that performs control for communication and an application processor (AP) that controls an upper layer, such as an application program.

The storage unit 1703 may store control information (e.g., information related to channel estimation, generated using DMRSs transmitted in the PUSCH determined by the base station 1700), data, or control information or data received from the UE and may have an area for storing data necessary for control by the controller 1702 and data generated when controlled by the controller 1702.

In various embodiments, a method for receiving a synchronization signal block (SSB) through a non-serving cell by a UE in a wireless communication system may comprise receiving information related to different SSB configurations through higher layer signaling (1401), identifying a serving cell and the non-serving cell (1402), receiving configuration information about a first physical channel to be transmitted through the serving cell (1403), identifying that a first SSB of the first SSB transmitted in the serving cell and a second SSB transmitted in the non-serving cell in a first transmission time unit overlaps a resource to which the first physical channel is mapped based on the SSB configurations (1405), and dropping transmission of the first physical channel through the serving cell and receiving the first SSB through the serving cell in response to the identification (1406).

In an embodiment, the method may further comprise identifying that the second SSB overlaps the resource to which the first physical channel is mapped in a second transmission time unit based on the SSB configurations, dropping reception of the second SSB through the non-serving cell in the second transmission time unit and transmitting the first physical channel through the serving cell in response to the identification.

In an embodiment, the method may further comprise receiving configuration information about a second physical channel to be transmitted through the serving cell, identifying that the first SSB overlaps a resource to which the second physical channel is mapped in a third transmission time unit based on the SSB configurations, and dropping transmission of the second physical channel in the third transmission time unit and receiving the first SSB in response to the identification.

In an embodiment, the method may further comprise identifying that the second SSB overlaps the resource to which the second physical channel is mapped in a fourth transmission time unit based on the SSB configurations, drop transmission of the second physical channel in the fourth transmission time unit and receiving the second SSB in response to the identification.

In an embodiment, the method may further comprise receiving configuration information about a third physical channel to be transmitted through the serving cell and a fourth physical channel to be transmitted through the non-serving cell, identifying that the first SSB overlaps the resource to which the third physical channel is mapped in a fifth transmission time unit based on the SSB configurations, transmitting the third physical channel without receiving the first SSB in the fifth transmission time unit in response to the identification, identifying that the first SSB overlaps a resource to which the fourth physical channel is mapped in a sixth transmission time unit based on the SSB configurations, dropping transmission of the fourth physical channel through the non-serving cell in the sixth transmission time unit and receiving the first SSB through the serving cell in response to the identification, identifying that the second SSB overlaps a resource to which the fourth physical channel is mapped in a seventh transmission time unit based on the SSB configurations, and dropping transmission of the fourth physical channel through the non-serving cell in the seventh transmission time unit and receiving the second SSB through the non-serving cell in response to the identification.

In various embodiments, a method for transmitting a synchronization signal block (SSB) through a non-serving cell by a base station in a wireless communication system may comprise transmitting, to a UE, information related to different SSB configurations through higher layer signaling (1601), identifying a serving cell and the non-serving cell (1402), transmitting, to the UE, configuration information about a first physical channel to be transmitted through the serving cell (1403), identifying that a first SSB of the first SSB transmitted in the serving cell and a second SSB transmitted in the non-serving cell in a first transmission time unit overlaps a resource to which the first physical channel is mapped based on the SSB configurations (1505), and determining that transmission of the first physical channel through the serving cell in the first transmission time unit is dropped by the UE in response to the identification (1506).

A UE receiving a synchronization signal block (SSB) through a non-serving cell in a wireless communication system according to various embodiments may comprise a transceiver 1501 and a processor 1602 coupled with the transceiver. The processor may be configured to receive information related to different SSB configurations through higher layer signaling, identify a serving cell and the non-serving cell, receive configuration information about a first physical channel to be transmitted through the serving cell, identify that a first SSB of the first SSB transmitted in the serving cell and a second SSB transmitted in the non-serving cell in a first transmission time unit overlaps a resource to which the first physical channel is mapped based on the SSB configurations, and drop transmission of the first physical channel through the serving cell and receive the first SSB through the serving cell in response to the identification.

A base station transmitting a synchronization signal block (SSB) through a non-serving cell in a wireless communication system according to various embodiments may comprise a transceiver 1701 and a processor 1702 coupled with the transceiver. The processor may be configured to transmit, to a UE, information related to different SSB configurations through higher layer signaling, identify a serving cell and the non-serving cell, transmit, to the UE, configuration information about a first physical channel to be transmitted through the serving cell, identify that a first SSB of the first SSB transmitted in the serving cell and a second SSB transmitted in the non-serving cell in a first transmission time unit overlaps a resource to which the first physical channel is mapped based on the SSB configurations, and determine that transmission of the first physical channel through the serving cell in the first transmission time unit is dropped by the UE in response to the identification.

Through embodiments of the disclosure, it is possible to determine whether to receive a synchronization signal block (SSB) transmitted through a non-serving cell in a 5G system. Further, through embodiments of the disclosure, it is possible to determine transmission or reception of another channel (e.g., PUSCH, PUCCH, PDCCH, or PDSCH) overlapping an SSB.

Effects obtainable from the disclosure are not limited to the above-mentioned effects, and other effects not mentioned may be apparent to one of ordinary skill in the art from the following description.

The embodiments herein are provided merely for better understanding of the disclosure, and the present invention should not be limited thereto or thereby. In other words, it is apparent to one of ordinary skill in the art that various changes may be made thereto without departing from the scope of the disclosure. Further, the embodiments may be practiced in combination.

The invention claimed is:

1. A method for transmitting, by a user equipment (UE), a physical uplink shared channel (PUSCH) in a wireless communication system, the method comprising:

receiving synchronization signal block (SSB) configurations related to first and second SSBs respectively corresponding to a serving cell and a non-serving cell and having different physical cell identifiers (PCIs);

determining available slots for PUSCH repeated transmission considering both the first SSB corresponding to the serving cell and the second SSB corresponding to the non-serving cell according to the SSB configurations;

identifying that at least one of the first SSB and the second SSB overlaps a resource to which the PUSCH is mapped in a first slot among the available slots; and dropping transmission of the PUSCH during the first slot and receiving the first SSB and/or the second SSB through the serving cell and/or the non-serving cell in response to the identification.

2. The method of claim 1, further comprising:

identifying that the second SSB overlaps the resource to which the PUSCH is mapped in a second slot among the available slots; and dropping reception of the second SSB through the non-serving cell during the second slot and transmitting the PUSCH through the serving cell in response to the identification.

3. The method of claim 1, further comprising:

receiving configuration information about a first physical channel;

identifying that the first SSB overlaps a first resource to which the first physical channel is mapped in a first transmission time unit based on the configuration information about the first physical channel and the SSB configurations; and dropping transmission of the first physical channel for the first transmission time unit and receiving the first SSB in response to the identification.

4. The method of claim 3, further comprising:

identifying that the second SSB overlaps a second resource to which the first physical channel is mapped in a second transmission time unit based on the configuration information about the first physical channel and the SSB configurations; and dropping transmission of the first physical channel and receiving the second SSB for a fourth transmission time unit in response to the identification.

5. The method of claim 1, further comprising:

receiving configuration information about a second physical channel;

identifying that the first SSB overlaps a third resource to which the second physical channel is mapped in a third transmission time unit based on the configuration information about the second physical channel and the SSB configurations; and transmitting the second physical channel through the serving cell without receiving the first SSB for the third transmission time unit in response to the identification.

6. The method of claim 5, further comprising:

receiving configuration information about a third physical channel;

identifying that the first SSB overlaps a fourth resource to which the third physical channel is mapped in a fourth transmission time unit based on the configuration information about the third physical channel and the SSB configurations;

dropping transmission of the third physical channel through the non-serving cell for the fourth transmission time unit and receiving the first SSB through the serving cell in response to the identification;

identifying that the second SSB overlaps a fifth resource to which the third physical channel is mapped in a fifth transmission time unit based on the configuration information about the third physical channel and the SSB configurations; and dropping transmission of the third physical channel through the non-serving cell for the fifth transmission time unit and receiving the second SSB through the non-serving cell in response to the identification.

7. A UE transmitting a physical uplink shared channel (PUSCH) in a wireless communication system, the UE comprising:

a transceiver; and a processor coupled with the transceiver, wherein the processor is configured to:

receive synchronization signal block (SSB) configurations related to first and second SSBs respectively corresponding to a serving cell and a non-serving cell and having different physical cell identifiers (PCIs), determine available slots for PUSCH repeated transmission considering both the first SSB corresponding to the serving cell and the second SSB corresponding to the non-serving cell according to the SSB configurations, identify that at least one of the first SSB and the second SSB overlaps a resource to which the PUSCH is mapped in a first slot among the available slots, and drop transmission of the PUSCH during the first slot and receive the first SSB and/or the second SSB through the serving cell and/or the non-serving cell in response to the identification.

8. The UE of claim 7, wherein the processor is further configured to:

identify that the second SSB overlaps the resource to which the PUSCH is mapped in a second slot among the available slots; and drop reception of the second SSB through the non-serving cell during the second slot and transmit the PUSCH through the serving cell in response to the identification.

9. The UE of claim 7, wherein the processor is further configured to:

receive configuration information about a first physical channel;

identify that the first SSB overlaps a first resource to which the first physical channel is mapped in a first transmission time unit based on the configuration information about the first physical channel and the SSB configurations; and drop transmission of the first physical channel for the first transmission time unit and receive the first SSB in response to the identification.

10. The UE of claim 9, wherein the processor is further configured to:

identify that the second SSB overlaps a second resource to which the first physical channel is mapped in a second transmission time unit based on the configuration information about the first physical channel and the SSB configurations; and drop transmission of the first physical channel for the second transmission time unit and receive the second SSB in response to the identification.

11. The UE of claim 7, wherein the processor is further configured to:

receive configuration information about a second physical channel;

identify that the first SSB overlaps a third resource to which the second physical channel is mapped in a third transmission time unit based on the configuration information about the second physical channel and the SSB configurations; and transmit the second physical channel through the serving cell without receiving the first SSB for the third transmission time unit in response to the identification.

12. The UE of claim 11, wherein the processor is further configured to:

receive configuration information about a third physical channel;

identify that the first SSB overlaps a fourth resource to which the third physical channel is mapped in a fourth transmission time unit based on the configuration information about the third physical channel and the SSB configurations;

drop transmission of the third physical channel through the non-serving cell for the fourth transmission time unit and receive the first SSB through the serving cell in response to the identification;

identify that the second SSB overlaps a fifth resource to which the third physical channel is mapped in a fifth transmission time unit based on the configuration information about the third physical channel and the SSB configurations; and drop transmission of the third physical channel through the non-serving cell for the fifth transmission time unit and receive the second SSB through the non-serving cell in response to the identification.

13. A method for receiving, by a base station, a physical uplink shared channel (PUSCH) in a wireless communication system, the method comprising:

transmitting, to a user equipment (UE), synchronization signal block (SSB) configurations related to first and second SSBs respectively corresponding to a serving cell and a non-serving cell and having different physical cell identifiers (PCIs);

determining available slots for PUSCH repeated transmission considering both the first SSB corresponding to the serving cell and the second SSB corresponding to the non-serving cell according to the SSB configurations;

identifying that at least one of the first SSB and the second SSB overlaps a resource to which the PUSCH is mapped in a first slot among the available slots; and determining that transmission of the PUSCH is dropped by the UE during the first slot in response to the identification.

14. The method of claim 13, further comprising:

identifying that the second SSB overlaps the resource to which the PUSCH is mapped in a second slot among the available slots; and receiving the PUSCH through the serving cell during the second slot in response to the identification.

15. A base station receiving a physical uplink shared channel (PUSCH) in a wireless communication system, the base station comprising:

a transceiver; and a processor coupled with the transceiver, wherein the processor is configured to:

transmit, to a user equipment (UE), synchronization signal block (SSB) configurations related to first and second SSBs respectively corresponding to a serving cell and a non-serving cell and having different physical cell identifiers (PCIs), determine available slots for PUSCH repeated transmission considering both the first SSB corresponding to the serving cell and the second SSB corresponding to the non-serving cell according to the SSB configurations, identify that at least one of the first SSB and the second SSB overlaps a resource to which the PUSCH is mapped in a first slot among the available slots, and determine that transmission of the PUSCH is dropped by the UE during the first slot in response to the identification.

16. The base station of claim 15, wherein the processor is further configured to:

identify that the second SSB overlaps the resource to which the PUSCH is mapped in a second slot among the available slots; and receive the PUSCH through the serving cell during the second slot in response to the identification.

17. The base station of claim 15, wherein the processor is further configured to:

transmit configuration information about a first physical channel;

identify that the first SSB overlaps a first resource to which the first physical channel is mapped in a first transmission time unit based on the configuration information about the first physical channel and the SSB configurations; and determine that transmission of the first physical channel for the first transmission time unit is dropped by the UE and transmit the first SSB in response to the identification.

18. The base station of claim 17, wherein the processor is further configured to:

identify that the second SSB overlaps a second resource to which the first physical channel is mapped in a second transmission time unit based on the configuration information about the first physical channel and the SSB configurations; and determine that transmission of the first physical channel is dropped by the UE and transmit the second SSB for a fourth transmission time unit in response to the identification.

19. The method of claim 13, further comprising:

transmitting configuration information about a first physical channel;

identifying that the first SSB overlaps a first resource to which the first physical channel is mapped in a first transmission time unit based on the configuration information about the first physical channel and the SSB configurations; and determining that transmission of the first physical channel for the first transmission time unit is dropped by the UE and transmitting the first SSB in response to the identification.

20. The method of claim 19, further comprising:

identifying that the second SSB overlaps a second resource to which the first physical channel is mapped in a second transmission time unit based on the configuration information about the first physical channel and the SSB configurations; and determining that transmission of the first physical channel is dropped by the UE and transmitting the second SSB for a fourth transmission time unit in response to the identification.

* * * * *